(12) United States Patent
Wang et al.

(10) Patent No.: US 11,864,022 B2
(45) Date of Patent: Jan. 2, 2024

(54) BUFFER STATUS REPORTING IN WIRELESS COMMUNICATION SYSTEMS

(71) Applicant: Telefonaktiebolaget LM Ericsson (publ), Stockholm (SE)

(72) Inventors: Min Wang, Luleå (SE); Hans Hannu, Luleå (SE); Ingemar Johansson, Luleå (SE)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 239 days.

(21) Appl. No.: 17/415,630

(22) PCT Filed: Dec. 20, 2018

(86) PCT No.: PCT/EP2018/086418
§ 371 (c)(1),
(2) Date: Jun. 17, 2021

(87) PCT Pub. No.: WO2020/126018
PCT Pub. Date: Jun. 25, 2020

(65) Prior Publication Data
US 2022/0070722 A1 Mar. 3, 2022

(51) Int. Cl.
*H04W 28/02* (2009.01)
(52) U.S. Cl.
CPC .............................. *H04W 28/0278* (2013.01)
(58) Field of Classification Search
CPC ................................................ H04W 28/0278
See application file for complete search history.

(56) References Cited

U.S. PATENT DOCUMENTS 10,313,920 B1 * 6/2019 Manchanda ...... H04W 28/0231
2010/0322098 A1 * 12/2010 Pelletier ................ H04W 72/52
370/252

(Continued)

FOREIGN PATENT DOCUMENTS

WO 2017/200562 A1 11/2017

OTHER PUBLICATIONS

International Search Report and Written Opinion dated Jul. 17, 2019 in International Application No. PCT/ EP2018/086418 (14 pages total).
NEC, "Optimized Buffer Status Reporting", 3GPP TSG-RAN WG2# 58bis Meeting, Tdoc R2-072515, Jun. 25-29, 2007, Orlando, USA, XP002503220 (6 pages total).

(Continued)

*Primary Examiner* — Christopher M Crutchfield
*Assistant Examiner* — Tito Q Pham
(74) *Attorney, Agent, or Firm* — Christopher & Weisberg, P.A.

(57) ABSTRACT

The disclosure provides methods, apparatus and machine-readable mediums relating to buffer status reporting in wireless communication systems. One aspect provides a method performed by a user equipment. The user equipment is configurable to communicate with a radio access node via a plurality of communication protocols, and to communicate with a network node via at least one congestion-controlled application transport protocol. The method comprises: generating a buffer status report comprising an indication of a first amount of data available for transmission from the user equipment, the first amount of data including at least data stored in a buffer for data conforming to the congestion-controlled application transport protocol; and transmitting the buffer status report to the radio access node.

13 Claims, 13 Drawing Sheets

(56) References Cited

U.S. PATENT DOCUMENTS

| | | | | |
|---|---|---|---|---|
| 2010/0329135 | A1* | 12/2010 | Pelletier | H04W 72/21 |
| | | | | 370/252 |
| 2017/0048857 | A1* | 2/2017 | Vajapeyam | H04W 28/0273 |
| 2017/0111927 | A1* | 4/2017 | Kim | H04W 72/21 |
| 2017/0212865 | A1 | 7/2017 | Yang et al. | |
| 2018/0139020 | A1* | 5/2018 | Takeda | H04W 72/21 |
| 2018/0220326 | A1* | 8/2018 | Nagasaka | H04W 28/0278 |
| 2019/0045388 | A1* | 2/2019 | Zhang | H04L 69/16 |
| 2019/0098621 | A1* | 3/2019 | Hong | H04W 72/21 |
| 2020/0153594 | A1* | 5/2020 | Kumar | H04L 5/0055 |
| 2020/0275311 | A1* | 8/2020 | Zhao | H04L 47/323 |
| 2022/0346192 | A1* | 10/2022 | Parron | H04W 72/52 |

OTHER PUBLICATIONS

3GPP TS 38.321 V15.3.0, 3rd Generation Partnership Project; Technical Specification Group Radio Access Network; NR; Medium Access Control (MAC) protocol specification (Release 15), Sep. 25, 2018, Sophia-Antipolis Cedex, France, XP051487371 (76 pages total).

3GPP TS 36.321 V15.3.0, 3rd Generation Partnership Project; Technical Specification Group Radio Access Network; Evolved Universal Terrestrial Radio Access (E-UTRA); Medium Access Control (MAC) protocol specification (Release 15), Sep. 2018, Sophia-Antipolis Cedex, France, XP051487508 (127 pages total).

EPO Communication dated Aug. 18, 2022 for Patent Application No. 18827099.5, consisting of 9-pages.

* cited by examiner

BUFFER STATUS REPORTING IN WIRELESS COMMUNICATION SYSTEMS

CROSS REFERENCE TO RELATED APPLICATIONS

This application is a 35 U.S.C. § 371 National Stage of International Patent Application No. PCT/EP2018/086418, filed Dec. 20, 2018.

TECHNICAL FIELD

Embodiments of the present disclosure relate to wireless communication systems, and particularly relate to the transmission, reception and processing of buffer status reports.

BACKGROUND

Many wireless communication systems use scheduling to allocate transmission resources (e.g., transmission frequencies, time slots or other resources, transmission codes, etc.) to those devices which have data to transmit. To ensure that resources are distributed appropriately amongst those devices, they may be required to report the amount of data they have available to transmit. In this way, a scheduler can grant sufficient resources that the available data can be transmitted. If too few resources are granted to the transmitting device, a further grant will be required before the data can be transmitted in its entirety; if too many resources are granted to the transmitting device, some resources will be wasted.

In $3^{rd}$ Generation Partnership Project (3GPP) New Radio (NR) and Long Term Evolution (LTE), a buffer status report (BSR) is a message transmitted by a user equipment (UE) to the radio access network (e.g., to a base station, or gNB), including an amount of available data for uplink transfer in the media access control (MAC) entity implemented in the UE, see for example 3GPP Technical Specification (TS) 38.321 V15.3.0 (2018-09). The BSR can be triggered periodically or when new uplink data is made available to the MAC entity. The reported buffer size includes the total amount of data across all logical channels of a logical channel group up to the radio link control (RLC), see for example 3GPP TS 38.322 V15.3.0 (2018-09), and packet data convergence protocol (PDCP) entity, see for example 3GPP TS 38.323 V15.3.0 (2018-09). The amount of data is indicated as a number of bytes. The gNB grants the UE enough resource in the uplink to transmit the reported bytes of data in the MAC entity.

All transport protocols intended to be used over the Internet, such as transmission control protocol (TCP), user datagram protocol (UDP), and quick UDP internet connections (QUIC), typically apply congestion control. Congestion control is a mechanism to control the transmission rate from a node, such as a server, laptop, mobile phone etc. A transport protocol entity, such as a TCP entity, utilizes a number of parameters, as set out below, to control how much data it can have outstanding at any one time. In this context, "outstanding data" is also known as "bytes in flight", and corresponds to the amount of data that has been transmitted but which has not yet been acknowledged as safely received (e.g., through an acknowledgement protocol such as automatic repeat request or its hybrid version).

Receiver window: The receiver window is a value that the sender receives from the receiving entity which indicates how much data the receiving entity can receive and buffer.

Congestion window: The congestion window is a control parameter which is set to a value which limits the amount of data which can be transmitted by the sender.

Send window: The send window is the maximum amount of data that can be made available for transmission by the TCP entity at any one time, and is set equal to the minimum of the receiver window and the congestion window (i.e. whichever is smallest). Thus, the TCP entity cannot transmit more data than can be received and buffered at the receiving device (i.e., the send window cannot be greater than the receiver window). If the congestion window is smaller than the receiver window (i.e. to control congestion in the network), then the send window is also smaller than the receiver window.

A TCP entity also has a buffer which is called a send buffer. The send buffer is the bytes of data made available by an application for the TCP entity to send. Taking into account the parameters defined above, when the TCP entity is to send new data from the send buffer, it calculates the size of new data according to the difference between the send window and the bytes in flight (i.e., such that the total amount of bytes in flight, after the new data is sent, does not exceed the send window).

A TCP entity, along with any other entities that use congestion control, may make use of several strategies to balance the increase and decrease of the transmission rate and possible retransmissions due to congestion induced packet losses. At the beginning of a transfer session, the TCP entity may apply something referred to as slow start. According to this strategy, the congestion window is initially set to a small value, e.g. 10 segments (usually ~10*1500 bytes), but then increases quickly, usually one segment per received acknowledgement. After the congestion window has reached a slow start threshold (or if a packet loss has occurred) the congestion window increases according to whichever congestion avoidance algorithm is in use, e.g., in the order of 1 segment per round trip time.

Devices connected to modern wireless communication systems are frequently required to transmit significant amounts of data, which is subject to a congestion control algorithm as set out above. This presents a problem when those devices also need to be granted transmission resources in order to transmit the data.

SUMMARY

Embodiments of the present disclosure seek to address, among others, the problem of slow growth of used uplink speed when congestion-controlled transport protocols such as TCP, QUIC/UDP are employed in conjunction with a radio access level buffer status reporting procedure Embodiments of the present disclosure provide buffer status report enhancement(s) which provide the advantage of speeding up the growth of the used uplink transmission rate and result in the uplink reaching its full transmission potential in a shorter time frame. This is highly useful for any congestion controlled services, i.e. most internet services.

According to a first aspect of the disclosure, there is provided a method performed by a user equipment. The user equipment is configurable to communicate with a radio access node via a plurality of communication protocols, and to communicate with a network node via at least one congestion-controlled application transport protocol. The method comprises: generating a buffer status report comprising an indication of a first amount of data available for transmission from the user equipment, the first amount of data including at least data stored in a buffer for data conforming to the congestion-controlled application transport protocol; and transmitting the buffer status report to the radio access node.

Apparatus and non-transitory machine-readable mediums are also provided for performing the method set out above. For example, in one aspect, a user equipment is provided, configured to perform the method (and other methods set out herein). In another aspect, there is provided a user equipment, being configurable to communicate with a radio access node via a plurality of communication protocols, and to communicate with a network node via at least one congestion-controlled application transport protocol.

The user equipment comprises processing circuitry and a non-transitory machine-readable medium storing instructions which, when executed by the processing circuitry, cause the user equipment to: generate a buffer status report comprising an indication of a first amount of data available for transmission from the user equipment, the first amount of data including at least data stored in a buffer for data conforming to the congestion-controlled application transport protocol; and transmit the buffer status report to the radio access node. In another aspect, the user equipment comprising processing circuitry configured to cause the user equipment to generate a buffer status report comprising an indication of a first amount of data available for transmission from the user equipment, the first amount of data including at least data stored in a buffer for data conforming to the congestion-controlled application transport protocol; and transmit the buffer status report to the radio access node.

In another aspect, there is provided a method performed by a radio access node. The method comprises: receiving a buffer status report from a user equipment, the user equipment being configurable to communicate with the radio access node via a plurality of communication protocols, and to communicate with a network node via at least one congestion-controlled application transport protocol, wherein the buffer status report comprises an indication of a first amount of data available for transmission from the user equipment, the first amount of data including at least data stored in a buffer for data conforming to the congestion-controlled application transport protocol; preparing an uplink grant comprising an indication of radio resources to be used by the user equipment for transmitting a second amount of data in an uplink transmission, wherein the second amount of data varies as a function of the first amount of data; and transmitting the uplink grant to the user equipment.

Apparatus and non-transitory machine-readable mediums are also provided for performing the method set out above. For example, in one aspect, a radio access node is provided, configured to perform the method (and other methods set out herein). In another aspect, there is provided a radio access node comprising processing circuitry and a non-transitory machine-readable medium storing instructions which, when executed by the processing circuitry, cause the radio access node to: receive a buffer status report from a user equipment, the user equipment being configurable to communicate with the radio access node via a plurality of communication protocols, and to communicate with a network node via at least one congestion-controlled application transport protocol, wherein the buffer status report comprises an indication of a first amount of data available for transmission from the user equipment, the first amount of data including at least data stored in a buffer for data conforming to the congestion-controlled application transport protocol; prepare an uplink grant comprising an indication of radio resources to be used by the user equipment for transmitting a second amount of data in an uplink transmission, wherein the second amount of data varies as a function of the first amount of data; and transmit the uplink grant to the user equipment.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Devices connected to modern wireless communication systems are frequently required to transmit significant amounts of data, which is subject to a congestion control algorithm as set out above. This presents a problem when those devices also need to be granted transmission resources in order to transmit the data.

Existing BSRs include the buffer size only up to the RLC and PDCP entities (although the size of the RLC and MAC may not be considered in the buffer size computation). This limits the increase in uplink speed granted to the UE by the gNB as the BSR reports only what the TCP entity outputs, and this in turn may be limited by the congestion window. A UE may have a large amount of data to transmit at the TCP entity, but only be able to report a small amount of that data (i.e. the part released to the RLC and PDCP entities) owing to congestion control. Typically, it will take several round-trip times to grow the congestion window to match the potential speed of the radio uplink.

Simply starting with a larger congestion window is not a good solution to this problem. Although the BSR may then indicate a more accurate value of the data that the UE has to transmit in the uplink, the UE may be experiencing poor radio conditions and have difficulty in successfully transmitting the data. Hence, the queuing delay at the UE will increase, and the TCP entity may determine that segments have been lost and trigger retransmissions. The TCP entity may even reduce the congestion window or, more drastically, reset the connection altogether. This would lead to worse performance than the default behavior.

One approach considered in the present disclosure is to include the size in bytes of the send buffer of the transport control entity, such as the send buffer of the TCP entity, in the Buffer Status Report triggered by the UE to indicate the amount of data it wants to transmit.

In another aspect the congestion window, e.g. the CWND of the TCP entity, is adjusted based on the corresponding size given by a received gNB grant which has been issued by the gNB in response to the BSR report sent in the first step.

Such approaches decrease the time for the radio access link to reach its full potential transmission rate corresponding to what has been granted by the radio access. This acceleration is achieved without any increase of congestion as the solutions may not override the TCP behaviour.

Note that TCP is to be read as one example of a congestion-controlled transport protocol entity.

These and other solutions will now be discussed in further detail, in conjunction with the Figures.

Figure 1:
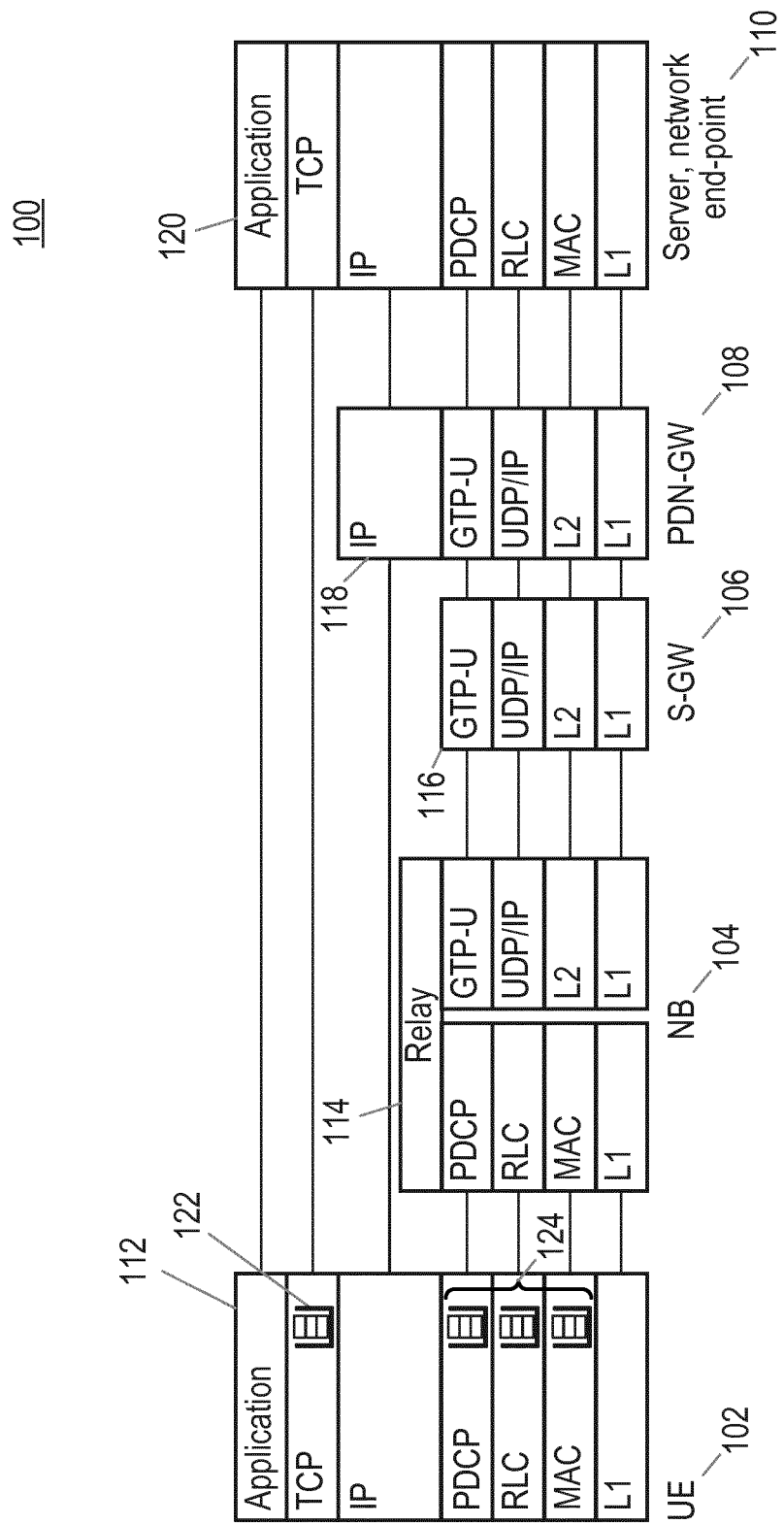
FIG. 1 shows a wireless communication network according to embodiments of the disclosure.

FIG. 1 shows a wireless communication network 100, and particularly shows user plane protocol layers associated with the wireless communication network in which embodiments of the disclosure apply. The illustrated embodiment shows a New Radio (NR) implementation; those skilled in the art will appreciate that embodiments of the disclosure are also relevant to other cellular network standards, such as Long Term Evolution, and to other radio access standards such as IEEE 802.11 standards (also referred to as WiFi).

The network 100 comprises a wireless device or user equipment 102, a radio access node or base station 104, a serving gateway (S-GW) 106, a public data network gateway (PDN-GW) 108 and a network node or server 110. The user equipment 102 is thus operable to transmit data to the server 110 via a transmission to the radio access node 104, which in turn transmits the data to the S-GW 106. The S-GW 106 transmits the data to the PDN-GW 108, and the PDN-GW 108 transmits the data to the server 110.

FIG. 1 also shows the respective protocol stacks implemented by each of the devices and nodes. Thus the user equipment 102 implements a protocol stack 112; the radio access node implements a protocol stack 114, and so on. Each protocol stack may be analogized to a stack of layers, with entities (i.e. virtual entities) on each level conforming to a particular communication protocol.

Those skilled in the art will appreciate that the transmission of data via a protocol stack usually operates through a process of encapsulation, with one or more entities in each layer encapsulating data packets produced by one or more entities in a layer above. The packets are then transmitted by the lowest layer (the physical layer) to the receiving entity, which receives the packet at its own respective lowest layer. The receiving device may decapsulate the received packets partially or entirely to access the data and control information encoded by the corresponding layers of the protocol stack in the transmitting device.

As shown in FIG. 1, the protocol stack 112 of the UE 102 comprises a plurality of layers, as follows: an application layer; an application transport protocol layer (TCP is given as an example, but others are possible); an internet protocol (IP) layer; a PDCP layer; an RLC layer; a MAC layer; and a physical layer (L1). A plurality of those protocols terminate at the radio access node 104. Thus the user equipment 102 is able to communicate with the radio access node 104 using a plurality of communication protocols. In the illustrated embodiment these are the physical protocol, the MAC protocol, the RLC protocol and the PDCP protocol. A data packet transmitted by the UE 102 to the radio access node 104 is received and partially decapsulated by the radio access node 104 to decode the data encoded by entities in the PDCP layer, the RLC layer, the MAC layer; and the L1 layer of the UE 102.

At least one of the protocols in the protocol stack 112 of the UE 102 does not terminate in the radio access node 104, however. The IP layer terminates in the PDN-GW 108 and the server 110, while the application layer and the TCP protocol layer terminate in the server 110. Data encapsulated by entities in the application layer, the TCP layer and the IP layer of the UE 102 is not decapsulated by the radio access node 104 or the S-GW 106 and therefore, despite being transmitted via these radio access network nodes, the radio access node 104 and the S-GW 106 are effectively "invisible" to the application data, the TCP data and the IP data. The UE 102 is thus able to communicate with a network node (such as the PDN-GW 108 or the server 110) via at least one application transport protocol.

FIG. 1 further shows a number of buffers implemented within the protocol stack 112 of the UE 102. Buffers may also be implemented in the protocol stacks of other nodes; however, these are omitted for brevity.

As described above, data in a protocol stack usually moves from an upper layer to a lower layer before transmission from the device. Thus, an entity within a particular layer of the protocol stack will prepare one or more data units, formulated according to the protocol of that particular layer, and pass those data units down to one or more lower layers of the stack. Data units passed to lower layers are often called protocol data units (PDUs). Those data units, when they are received by lower layers, are often called service data units (SDUs). An entity in the lower layer thus receives an SDU, encapsulates it according to the protocol of the lower layer (potentially with one or more other SDUs), and passes the data unit as a PDU on to a further lower layer. This process repeats until the lowest layer of the stack is reached, and the data packet is transmitted from the sending device to the receiving device.

Buffers are useful in this context to store data temporarily, prior to its encapsulation and formation into a PDU to be passed to lower layers or transmitted from the device. For example, the rate at which data can be passed to lower layers or transmitted from the device may be dependent on a number of factors, such as the prevalent radio conditions experienced by the device, or a congestion control algorithm. If the rate slows, data can be stored temporarily in the buffers. For the purposes of the present disclosure, it is sufficient to state that the protocol stack 112 comprises a first buffer 122 in the application transport protocol layer (such as TCP, UDP or QUIC), and one or more buffers 124 in the protocol layers which terminate at the radio access node. In the illustrated embodiment, the buffers 124 include buffers at each of the PDCP layer, the RLC layer and the MAC layer.

According to embodiments of the disclosure, the user equipment is configured to generate and transmit a buffer status report which comprises an indication of an amount of data available for transmission from the user equipment. The amount of data includes an amount of data stored in the buffer 122 for data conforming to the application transport protocol (e.g., TCP, UDP, QUIC, etc.). Thus embodiments of the present disclosure propose extending conventional buffer status reports to additionally include an indication of the amount of data stored in an application transport protocol buffer of the user equipment. The buffer status report may comprise a single indication of an amount of data (e.g., for a particular logical channel or logical channel group), with that amount of data including data stored in the application transport protocol buffer 122 plus potentially other buffers 124 (such as the PDCP, RLC and/or MAC buffers). Alternatively, separate respective indications may be provided for the amount of data stored in the application transport protocol buffer 122 plus the amount of data stored in other buffers 124 (such as the PDCP, RLC and/or MAC buffers). These different possibilities are discussed below, particularly with respect to FIGS. 3, 4a and 4b.

In this way, the network is informed of the amount of data available for transmission from the user equipment, regardless of the congestion control algorithm implemented in the application transport protocol layer, and is able to take that amount of data into account when granting uplink resources for the user equipment to transmit the data with. For example, a radio access node receiving the buffer status report is able to transmit an uplink grant of an amount of resources which may be increased to take into account the additional data in the application transport protocol buffer 122. The radio access node may grant uplink resources taking into account the needs of other user equipments it is serving, and particularly may give a higher priority to data in the PDCP, RLC and MAC buffers 124 than to data in the application transport protocol buffer 122.

The user equipment may therefore receive a grant of uplink resources from the radio access node. In some embodiments, the user equipment may then adjust its value of the congestion window in dependence on the amount of UL resources granted to it. For example, the congestion window may be set equal to the amount of UL resources, such that the data can be transmitted almost immediately, not subject to congestion control. Alternatively or additionally, increases in the congestion window may be subject to an upper limit, so that the congestion window does not increase too quickly and risk congestion in the network. For example, the user equipment may set its congestion window to the smaller of the amount of UL resources granted to it and a configured threshold increase (which may be predetermined or signalled to the user equipment). In either case, the congestion window can be expected to increase more quickly than would be the case in conventional systems, such that latency and user waiting time is decreased.

Figure 2:
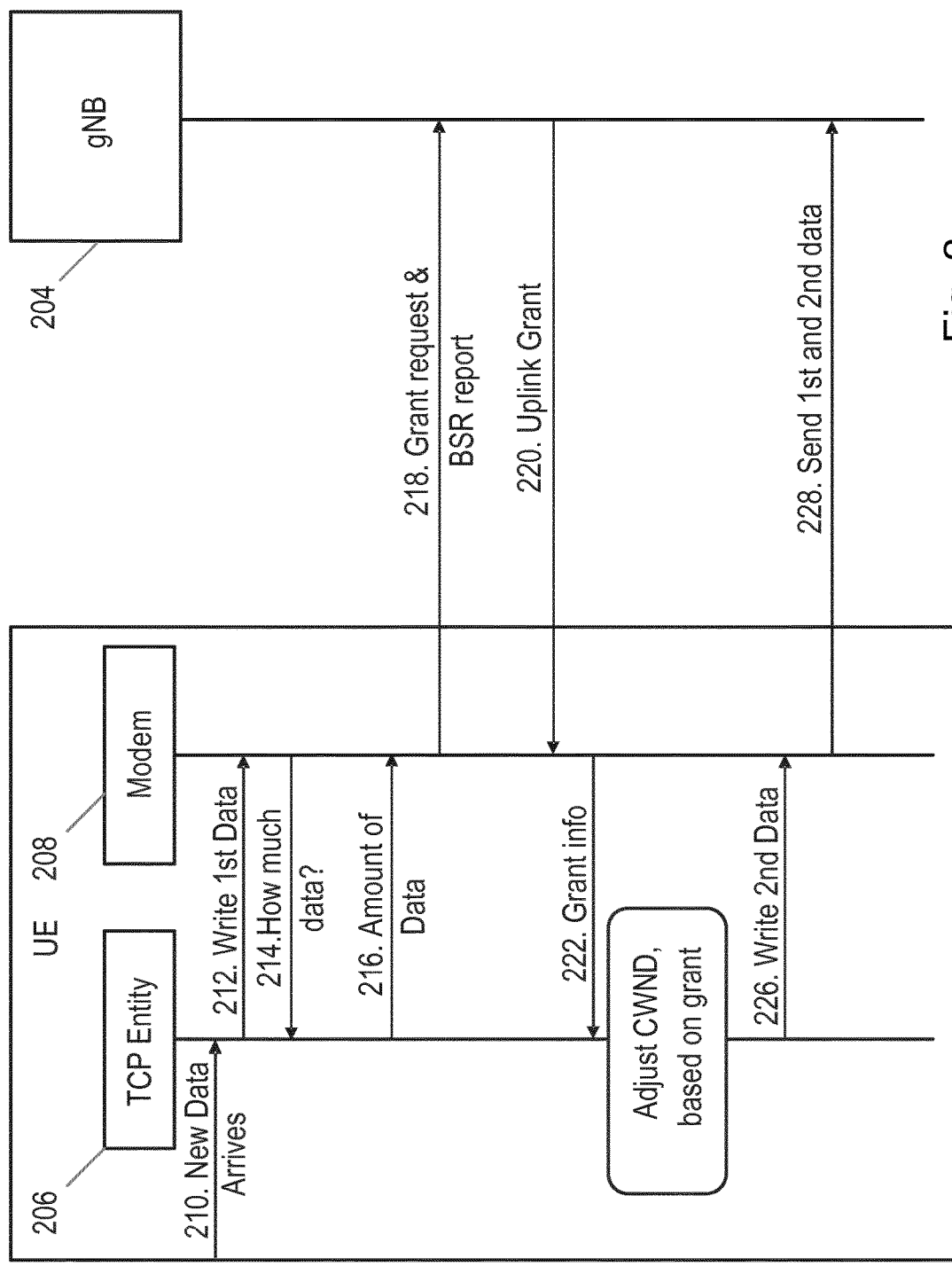
FIG. 2 is a signalling diagram according to embodiments of the disclosure.

FIG. 2 is a signalling diagram according to embodiments of the disclosure, between a user equipment 202, which comprises an application transport protocol entity 206 and a modem 208, and a radio access node 204. The application transport protocol entity 206 is described here as a TCP entity, but as noted above may utilize TCP, UDP, QUIC or any other application transport protocol which applies a congestion control algorithm. The modem 208 implements lower layers of the protocol stack, such as the PDCP, RLC, MAC and PHY layers. The radio access node 204 is described as a gNB, i.e. a next generation NodeB, but may be any suitable radio access node, base station, transmission-reception point (TRP) or access point.

210. New data arrives at the TCP entity 206 for transmission from the user equipment 202. The data is stored in a buffer at the TCP entity 206.

212. Data is written by the TCP entity 206 to the modem 208. This is described as "1$^{st}$ data in the figure. As noted above, the 1$^{st}$ data may be provided as one or more PDUs, and stored in one or more buffers at the modem 208, such as PDCP, RLC and/or MAC buffers. The amount of data which is written in this step ("1$^{st}$ data") is limited by the application of a congestion control algorithm. For example, the amount of data may be equal to a congestion window of that algorithm.

214. In order to transmit the data, the user equipment 202 needs to be granted resources. Therefore a BSR is prepared to report the amount of data that is available to transmit. According to embodiments of the disclosure, the BSR additionally includes information as to the amount of data in the TCP buffer. Thus in step 214 the modem 208 enquires how much data is stored in the buffer at the TCP entity 206.

216. The TCP entity 206 responds with an indication of the amount of data in its buffer. In alternative embodiments, this information may be provided at the same time as writing data to the modem 208 in step 212.

218. The UE 202 transmits a BSR message comprising an indication of an amount of data available for transmission from the UE 202. The BSR message may be transmitted together with a scheduling request, or using resources already granted to the UE 202.

As noted above, the amount of data includes at least the amount of data stored in the TCP buffer. The buffer status report may comprise an indication of an amount of data (e.g., for a particular logical channel or logical channel group), with that amount of data including data stored in the application transport protocol buffer 122 plus potentially other buffers 124 (such as the PDCP, RLC and/or MAC buffers). Alternatively, separate respective indications may be provided for the amount of data stored in the application transport protocol buffer 122 plus the amount of data stored in other buffers 124 (such as the PDCP, RLC and/or MAC buffers). Separate indications of the amounts of data may be provided for each logical channel or logical channel group.

220. The radio access node 204 transmits an uplink grant of an amount of resources to be used by the user equipment for transmitting data in the uplink. The granted resources which may be increased to take into account the additional data in the TCP buffer. The radio access node may grant uplink resources taking into account the needs of other user equipments it is serving, and particularly may give a higher priority to data in the PDCP, RLC and MAC buffers 124 than to data in the application transport protocol buffer 122.

222. Information concerning the granted resources is provided by the modem 208 to the TCP entity 206. For example, the modem 208 may provide the amount of data which can be transmitted using the granted resources (which may typically be indicated in the uplink grant message received in step 220).

224. The TCP entity 206 adjusts its value of the congestion window in dependence on the amount of UL resources granted to it. For example, the congestion window may be set equal to the amount of data which can be transmitted using the UL resources, such that the data can be transmitted almost immediately, not subject to congestion control.

Alternatively or additionally, increases in the congestion window may be subject to an upper limit, so that the congestion window does not increase too quickly and risk congestion in the network. For example, a maximum increase threshold may be applied, such that the congestion window cannot increase by more than the maximum increase threshold. In such an embodiment, the user equipment may set its congestion window to the smaller of the amount of data which can be transmitted using the UL resources granted to it, and its current value of the congestion window plus the configured threshold increase (which may be predetermined or signalled to the user equipment).

226. The TCP entity 206 determines a further amount of data ("2nd data" in the Figure) to be released from its buffer for transmission from the UE 202, based on the new value of the congestion window. The further amount of data may be calculated by determining the difference between the send window and the amount of data in flight. In the scenario of FIG. 2, the amount of data in flight may be small or zero, such that the amount of data written in step 206 is equal or almost equal to the send window (which is itself equal to the smaller of the congestion window and the receiver window). The further amount of data may be written to one or more buffers in the modem 208.

228. The modem 208 transmits the data in its buffers (e.g., in one or more of the PDCP, RLC and MAC buffers) to the radio access node 204, using the resources allocated to it in step 220.

Thus buffer status reports according to embodiments of the disclosure comprise information on an amount of data available at an application transport protocol buffer for transmission from the UE. The BSRs may take different forms in different embodiments of the disclosure. In one set of embodiments, the BSRs take their conventional format (e.g., as described in 3GPP TS 36.321, v 15.3.0). However, the amount of data which is reported additionally includes the data stored in the application transport protocol buffers. These BSR formats are described below with respect to FIG. 3. In another set of embodiments, the BSRs are adapted from their conventional format. For example, the BSRs may comprise an indication of the buffers which are reported, and/or separate indications of the amounts of data reported in each buffer. These BSR formats are described below with respect to FIGS. 4*a* and 4*b*. The numbers of bits dedicated to each BSR format and the respective fields within those BSR formats are given as examples only.

In one embodiment, the BSRs are formulated by a MAC entity, and transmitted as MAC control elements (CEs). Alternatively, a different protocol entity may formulate the BSRs.

Figure 3:
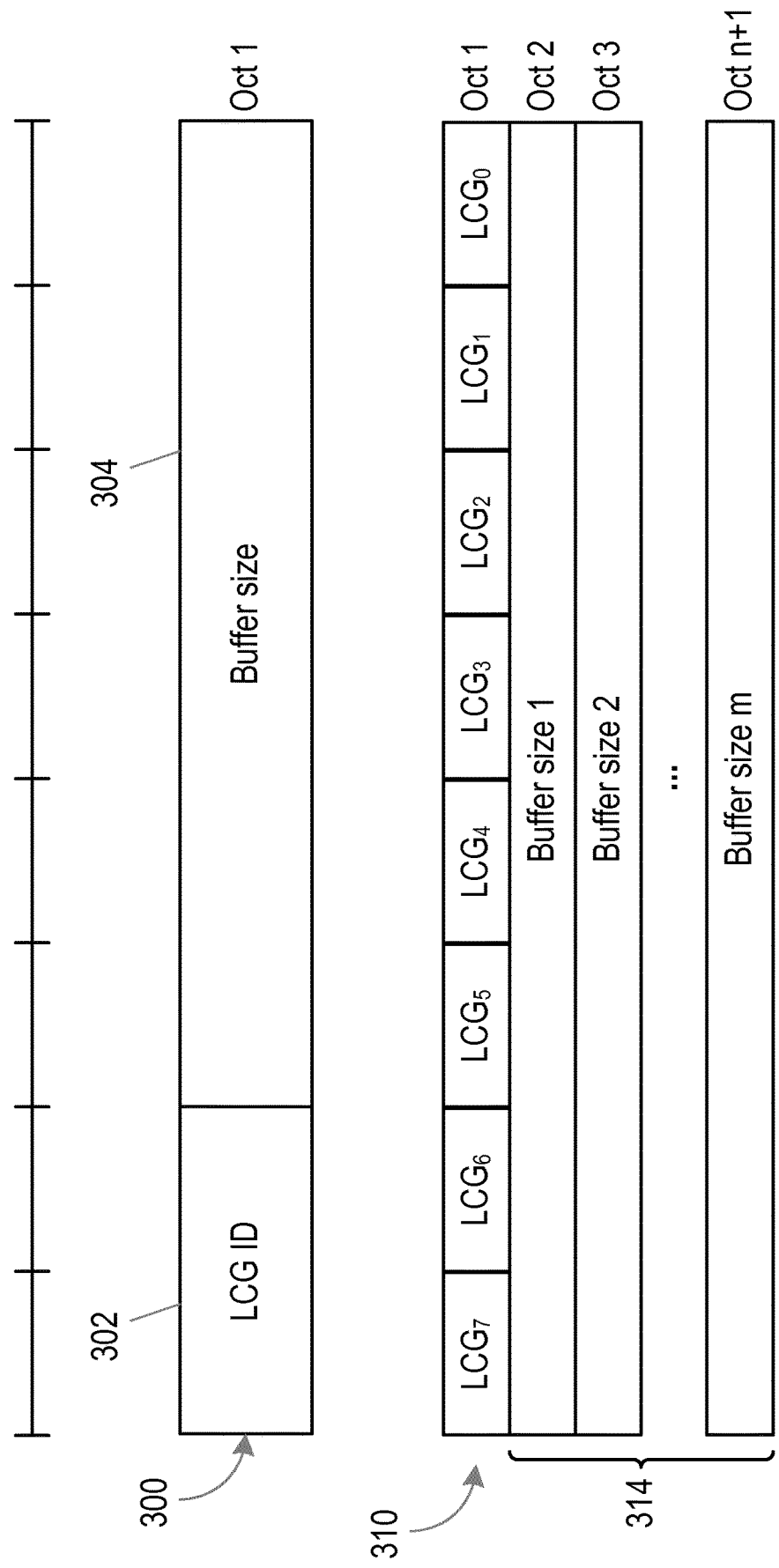
FIG. 3 shows examples of buffer status reports according to embodiments of the disclosure.

FIG. 3 shows examples of buffer status reports according to embodiments of the disclosure. In particular, FIG. 3 shows a short BSR format 300 and a long BSR format 310. These BSR formats are conventional. However, the amount of data reported in the BSR additionally includes the data stored in the application transport protocol buffers.

The short BSR format 300 relates to a single logical channel or logical channel group. It comprises an identity field 302, identifying the logical channel or logical channel group, and a buffer size field 304, indicating the amount of data corresponding to the identified logical channel or logical channel group which is stored in buffers at the UE (e.g., at least the data stored in the application transport protocol buffers for that logical channel or logical channel group, and possibly the data stored in other buffers for that logical channel group). The amount of data may be indicated with an index, which corresponds to an amount of data (e.g., in a look-up table). This applies to all indications of amounts of data described herein. In the illustrated example, the short BSR format is one byte long, with the identity field 302 comprising two bits and the buffer size field 304 comprising six bits.

The long BSR format 310 relates to one or more logical channels or logical channel groups, and comprises a bitmap 312 and one or more buffer size fields 314.

The bitmap 312 comprises indications of the logical channels or logical channel groups for which buffer sizes are reported. The logical channels or logical channel groups may be configured in a particular order, such that a bit in a certain position of the bitmap 312 is known to correspond to a particular logical channel or logical channel group. In the illustrated embodiment, the bitmap is eight bits long.

The long BSR format 310 comprises buffer size fields 314 for those logical channels or logical channel groups which have positive indications in the bitmap 312. The buffer fields 314 may be arranged in a predetermined order so that they can be associated with a particular logical channel or logical channel group. For example, in one embodiment the buffer fields 314 are arranged in the same order as the bits of the bitmap 312. However, alternative arrangements are possible.

Each buffer size field 314 indicates the amount of data corresponding to the respective logical channel or logical channel group which is stored in buffers at the UE (e.g., at least the data stored in the application transport protocol buffers for that logical channel or logical channel group, and possibly the data stored in other buffers for that logical channel group).

The BSR formats 300 and 310 thus comprise an indication of an amount of data which is available to transmit from the UE. According to embodiments of the disclosure, this amount of data additionally includes the amount of data stored in an application transport protocol buffer.

In further embodiments of the disclosure, an indication may be provided within the BSR or associated with the BSR, as to whether the buffer size fields 304, 314 relate to data stored in the application transport protocol buffer, in the PDCP, RLC and MAC buffers, or both. For example, the indication may be provided within a subheader of the BSR (e.g., in the MAC subheader), within a reserved field. In one embodiment, the indication comprises a single bit. If the bit is in a first state, the buffer size fields relate to data stored in the PDCP, RLC and MAC buffers; if the bit is in a second state, the buffer size fields additionally include data stored in the application transport protocol buffer.

Figure 4A:
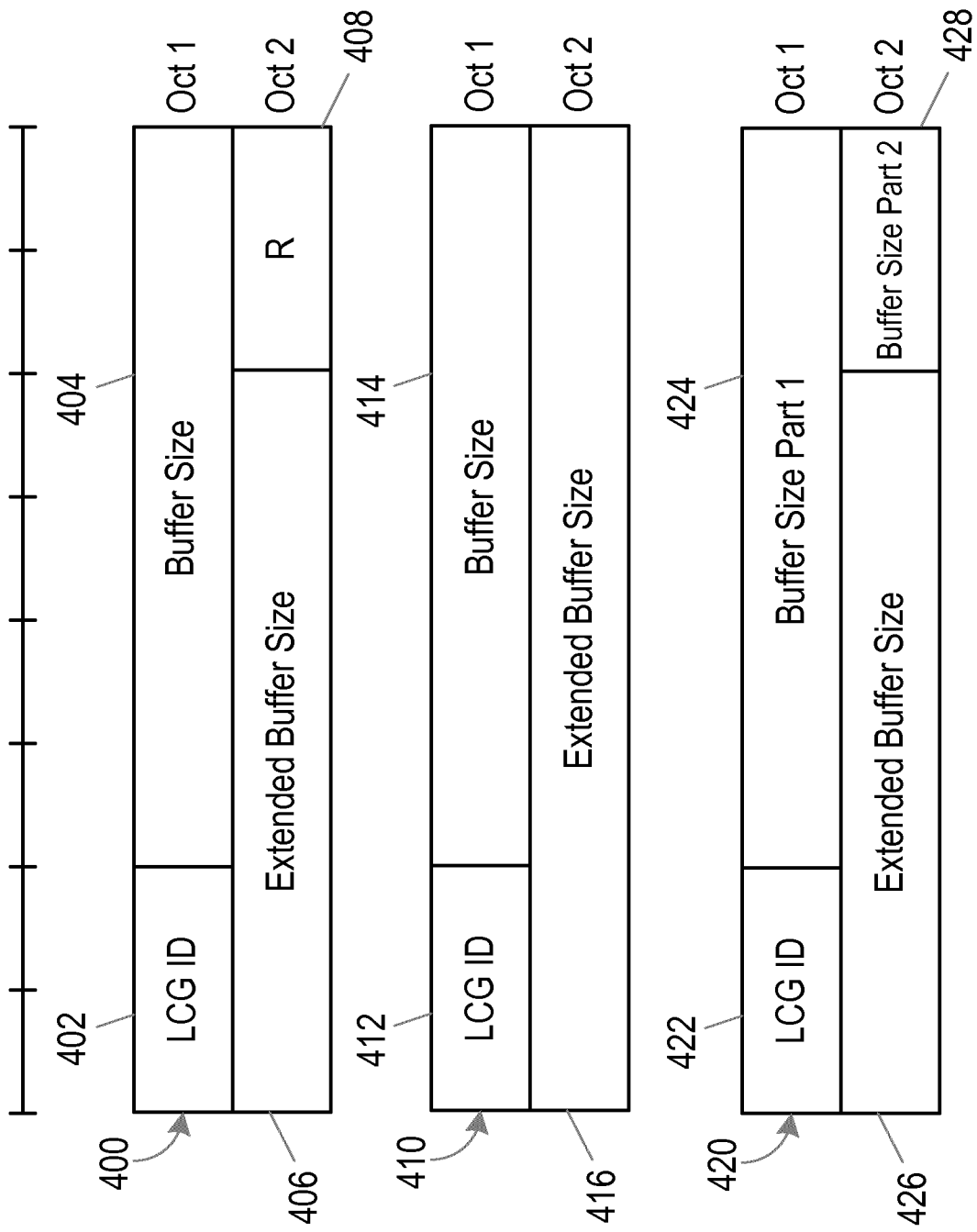
FIGS. 4a and 4b show examples of buffer status reports according to further embodiments of the disclosure.
Figure 4B:
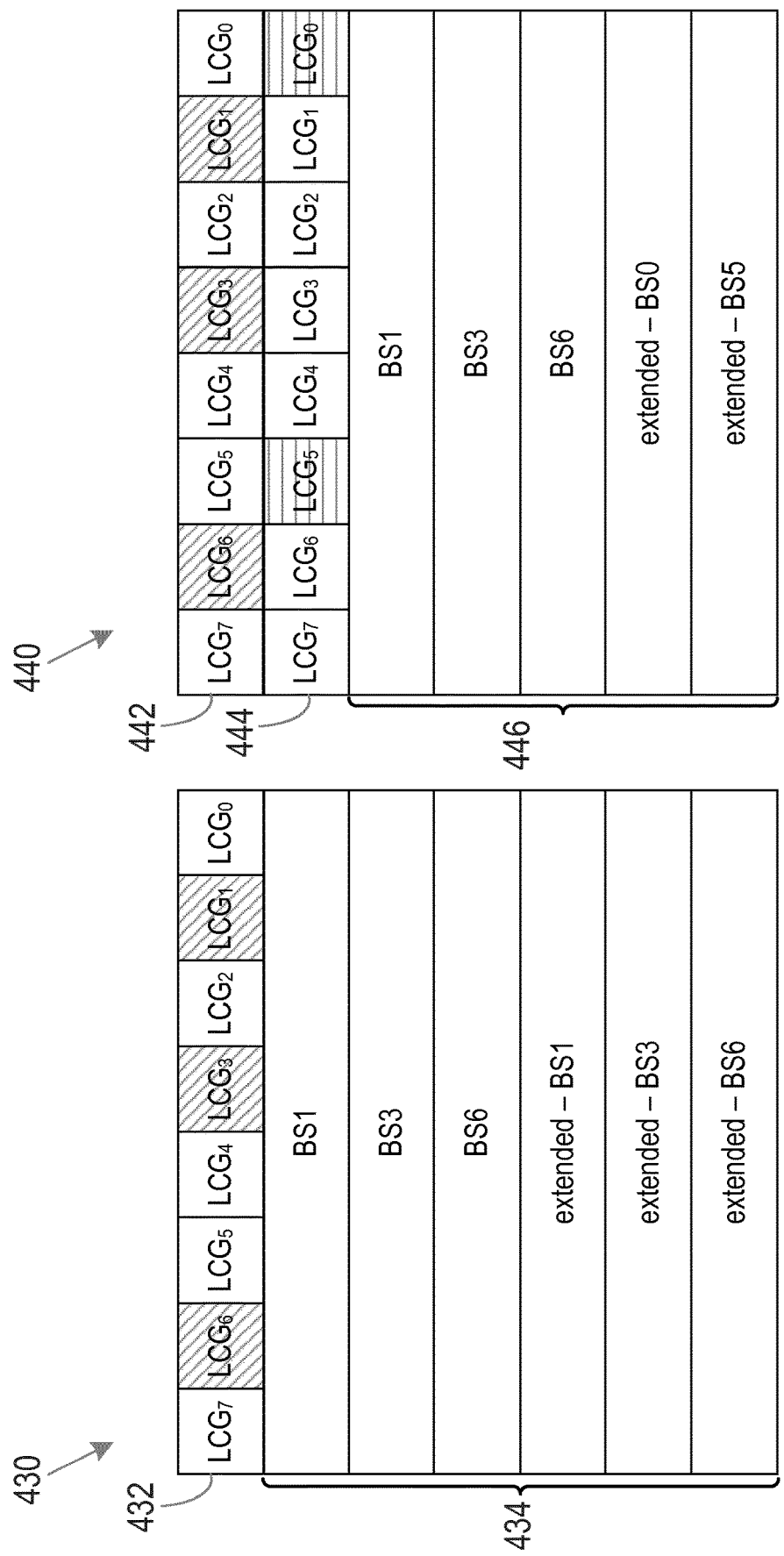

FIGS. 4*a* and 4*b* show examples of buffer status reports according to further embodiments of the disclosure.

FIG. 4*a* shows three examples of short BSR formats according to embodiments of the disclosure. Each short BSR format relates to a single logical channel or logical channel group, and comprises separate indications of the amount of data available at the application transport protocol buffers and the amount of data available at other buffers (e.g., PDCP, RLC and/or MAC buffers).

A first format 400 of the short BSR comprises an identity field 402, a buffer size field 404, an extended buffer size field 406 and a reserved (R) field 408. The identity field 402 and the buffer size field 404 are similar to their counterparts 302, 304 described above with respect to FIG. 3. However, the buffer size field 404 contains only an indication of the amount of data stored in the PDCP, RLC and MAC buffers for the identified logical channel or logical channel group. The R field 408 may be reserved for future extensions to the BSR format 400.

The extended buffer size field 406 comprises a separate indication of the amount of data stored in the application transport protocol buffer for the identified logical channel or logical channel group. In the first format 400, this extended buffer size field is five bits long. The reserved field 408 occupies three bits and completes the second octet of the format 400.

A second format 410 comprises an identity field 412, a buffer size field 414, and an extended buffer size field 416. The identity field 412 and the buffer size field 414 are the same as their counterparts 402, 404 described above. The extended buffer size field 416 is the same as its counterpart 406 described above, but occupies eight bits and therefore the entire second octet. Thus a greater range of values, or more granular values, are possible using the larger extended buffer size field 416.

A third format 420 comprises an identity field 422, a first part of a buffer size field 424, an extended buffer size field 426, and a second part of the buffer size field 428. Here the extended buffer size field 426 has the same size as its counterpart 406 described above (i.e. five bits). However, the buffer size field is split into two parts and thus comprises nine bits in total. Thus a greater range of values, or more granular values, can be reported for the buffer size field in the third format 420.

FIG. 4b shows two examples of long BSR formats according to embodiments of the disclosure. Each long BSR format relates to one or more logical channels or logical channel groups, and comprises separate indications of the amount of data available at the application transport protocol buffers and the amount of data available at other buffers (e.g., PDCP, RLC and/or MAC buffers).

A first long BSR format 430 comprises a bitmap 432 and one or more buffer size fields and extended buffer size fields 434. The bitmap 432 comprises indications of the logical channels or logical channel groups for which buffer sizes and extended buffer sizes are reported. The logical channels or logical channel groups may be configured in a particular order, such that a bit in a certain position of the bitmap 432 is known to correspond to a particular logical channel or logical channel group. The bitmap 432 may comprise only a single bit for each logical channel or logical channel group. In the illustrated embodiment, the bitmap is eight bits long.

The first long BSR format 430 comprises both buffer size fields and extended buffer size fields 434 for those logical channels or logical channel groups which have positive indications in the bitmap 432. Thus if a bit of the bitmap indicates that information is provided for a particular logical channel or logical channel group, both buffer size and extended buffer size fields are provided for that particular logical channel or logical channel group. In this example, the buffer size field contains only an indication of the amount of data stored in the PDCP, RLC and MAC buffers for the identified logical channel or logical channel group, whereas the extended buffer size field comprises a separate indication of the amount of data stored in the application transport protocol buffer for the identified logical channel or logical channel group.

The buffer size and extended buffer size fields 434 may be arranged in any predetermined order so that they can be associated with a particular logical channel or logical channel group. For example, in the illustrated embodiment the buffer size fields for all indicated logical channels or logical channel groups are provided first, in an order which is inverted relative to their order in the bitmap 432, and then the extended buffer size fields in the same order. However, alternative arrangements are possible. For example, the buffer size fields may be interleaved with the extended buffer size fields, such that the buffer size field and the extended buffer size field appear adjacent to each other in the BSR.

A second long BSR format 440 comprises first and second bitmaps 442, 444, and one or more buffer size fields and extended buffer size fields 446. The first bitmap 442 comprises indications of the logical channels or logical channel groups for which buffer size fields are included. The second bitmap 444 comprises indications of the logical channels or logical channel groups for which extended buffer size fields are included. Alternative arrangements are possible, of course. For example, a single two-byte bitmap may be provided, with two bits dedicated to each logical channel or logical channel group (and indicating whether a buffer size field and/or an extended buffer size field is provided for that logical channel or logical channel group).

The logical channels or logical channel groups may be configured in a particular order, such that a bit in a certain position of the bitmaps is known to correspond to a particular logical channel or logical channel group. In the illustrated embodiment, each bitmap 442, 444 is eight bits long.

Here it will be noted that the second long BSR format 440 differs from the first long BSR format 430 in that only a buffer size field, or only an extended buffer size field may be reported for a particular logical channel or logical channel group. In the illustrated example, buffer size fields are provided for each of logical channel groups 6, 3 and 1, while extended buffer size fields are provided for logical channel groups 5 and 0.

As with the first long BSR format 430, the buffer size fields contain only an indication of the amount of data stored in the PDCP, RLC and MAC buffers for the identified logical channel or logical channel group, whereas the extended buffer size fields comprise a separate indication of the amount of data stored in the application transport protocol buffer for the identified logical channel or logical channel group.

Figure 5:
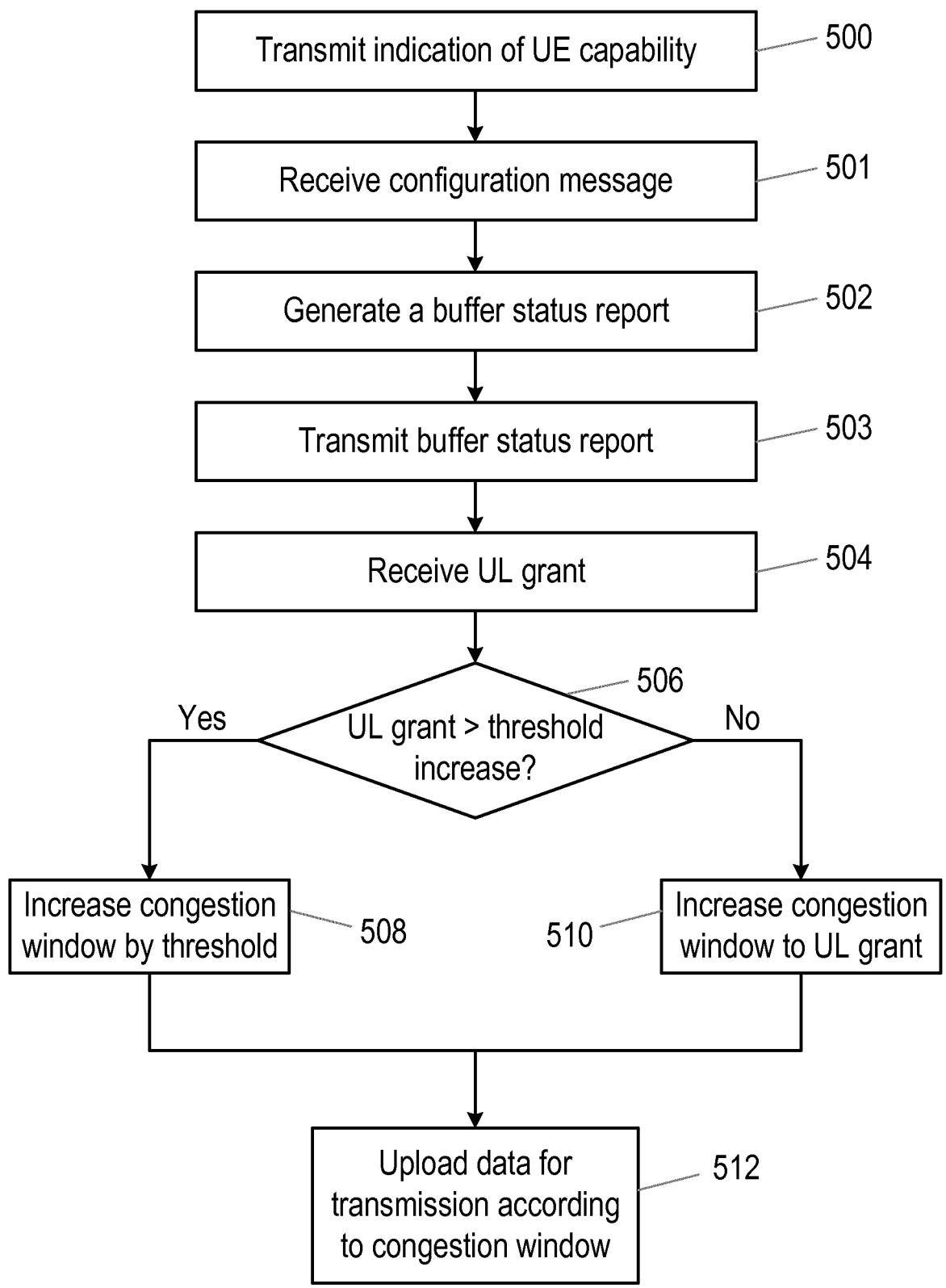
FIG. 5 is a flowchart of a method performed by a user equipment according to embodiments of the disclosure.

FIG. 5 is a flowchart of a method performed by a user equipment (UE) according to embodiments of the disclosure. The method may correspond to some or all of the signalling of the UE 202 described above with respect to FIG. 2, for example.

The method begins in step 500, in which the UE transmits, to a radio access node (e.g., a base station, gNB, etc.), an indication of the UE's capability, and particularly the UE's capability to transmit buffer status reports (BSRs) comprising information on an amount of data stored in the UE's application transport protocol buffers. For example, the capability may be signalled to the radio access node using radio resource control (RRC) signalling, upon the UE's connection to a cell served by the radio access node.

In step 501, the UE receives a configuration message, configuring the UE to report an amount of data stored in the UE's application transport protocol buffers in BSRs. The configuration message may be based on the capability of the UE indicated in step 500. If the UE is capable of transmitting BSRs comprising information on an amount of data stored in the UE's application transport protocol buffers, the configuration message may configure the UE to do so. The configuration message may again be transmitted via RRC signalling.

The configuration message may configure the UE to report an amount of data stored in the UE's application transport protocol buffers in all BSRs (i.e. for all logical channels or logical channel groups). In such an example, the configuration message may comprise a BSR-Config message or information element. In an alternative embodiment, the configuration message may configure the UE to report an amount of data stored in the UE's application transport protocol buffers in BSRs for particular logical channels or logical channel groups. In such an example, the configuration message may comprise a LogicalChannelConfig message or information element for each logical channel or logical channel group. See below for specific examples of these information elements.

In step 502, the UE generates a buffer status report (BSR). The BSR may be triggered periodically or when new uplink data is made available for transmission from the UE. The BSR may be generated by a MAC entity within the UE, and may comprise a MAC control element. The BSR may take any of the formats described above, for example, with respect to FIGS. 3, 4a and 4b. In accordance with embodiments of the disclosure, the BSR comprises an indication of a first amount of data available to transmit at the UE, including at least data stored in an application transport protocol buffer. The first amount of data may further comprise data stored in one or more other buffers of the UE, such as PDCP, RLC and/or MAC buffers, i.e. a single amount of data is indicated, and that data includes data stored in the application transport protocol buffer and additionally data stored in one or more other buffers. Alternatively, the first amount of data may comprise only the amount of data stored in the application transport protocol buffer. The amount of data stored in other buffers may be provided in separate indications. In either case, the BSR may comprise an indication of the buffers for which amounts of data are reported. The amounts of data may be organized into logical channels or logical channel groups, with separate amounts of data reported for each logical channel or logical channel groups, or only for certain logical channels or logical channel groups.

In step 503, the UE transmits the generated BSR to a radio access node, such as a base station, or an access point. The radio access node is thus informed of the amount of data available at the UE for uplink transmissions, and grants resources to the UE for transmitting a second amount of data. The second amount of data varies as a function of the first amount of data. For example, the second amount of data may be equal to or greater than the first amount of data (i.e., the radio access node grants sufficient resources to transmit the entirety of the data reported in the BSR). However, the radio access node may have to take into account the competing needs of other UEs that it is serving, and therefore the second amount of data may be less than the first amount of data. In either case, the second amount of data is greater than would have been the case had the BSR not included the amount of data stored in the application transport protocol buffer, i.e. the second amount of data includes an additional grant of resources compared to conventional methods.

Thus in step 504 the UE receives an uplink grant of resources from the radio access node for transmitting the second amount of data. The uplink grant may comprise an indication of the resources which are to be used for transmitting the data (e.g., frequency resources, such as one or more subcarriers; time resources such as one or more time slots, transmission time intervals, subframes, etc). The uplink grant may also comprise an indication of the modulation scheme which is to be used for transmitting the data. The uplink grant may comprise an indication of the amount of data (e.g., in bytes) which is to be transmitted, or which can be transmitted, using the allocated resources.

In step 506, the UE determines whether the second amount of data is greater than a threshold value. For example, the threshold value may be set relative to an existing value of a congestion window implemented in the application transport protocol (e.g., an absolute amount of data greater than the current value, or a proportional amount greater than the current value).

If the second amount of data is greater than the threshold value, the value of the congestion value is changed in step 508 to match the threshold value. In such embodiments, the value of the congestion window is not permitted to increase too rapidly. Thus if the second amount is too large (or too much larger than the existing congestion window), a preconfigured maximum increase is applied to the congestion window. If the second amount of data is less than the threshold value, the value of the congestion value is changed in step 510 to match the second amount of data.

Alternative embodiments of the disclosure may omit steps 506 and 508, and increase the congestion window to match the second amount of data without comparing it to a threshold.

In step 512, the application transport protocol releases data for transmission by the UE (e.g., to lower layers such as the PDCP, RLC and MAC layers) according to the new value of the congestion window. The amount of data released may be calculated by determining the difference between the send window and the amount of data in flight.

Those skilled in the art will appreciate that the method described above with respect to FIG. 5 may be performed in multiple stages or as part of multiple processes. For example, the configuration of the UE, described above with respect to steps 500 and 501, may be performed upon the UE's connection to a cell served by the radio access node (e.g. upon connection to the wireless communication system itself, or upon handover to the radio access node). Steps 502 onwards may be performed separately, as and when the UE has data available to transmit to the network.

Figure 6:
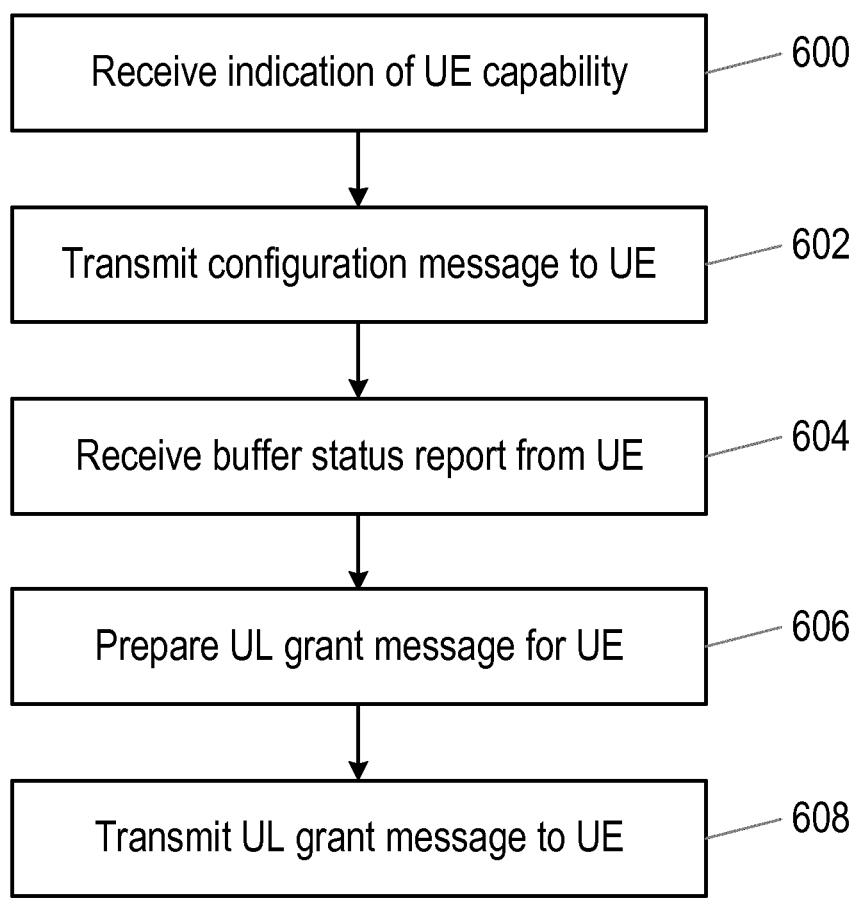
FIG. 6 is a flowchart of a method performed by a radio access node according to embodiments of the disclosure.

FIG. 6 is a flowchart of a method performed by a radio access node according to embodiments of the disclosure. The method may correspond to some or all of the signalling of the gNB 204 described above with respect to FIG. 2, for example.

The method begins in step 600, in which the radio access node receives an indication of a user equipment's capability, and particularly the user equipment's capability to transmit BSRs comprising information on an amount of data stored in the UE's application transport protocol buffers. For example, the capability may be signalled to the radio access node using radio resource control (RRC) signalling, upon the UE's connection to a cell served by the radio access node.

In step 602, the radio access node transmits a configuration message to the UE, configuring the UE to report an amount of data stored in the UE's application transport protocol buffers in BSRs. The configuration message may be based on the capability of the UE indicated in step 600. If the UE is capable of transmitting BSRs comprising information on an amount of data stored in the UE's application transport protocol buffers, the configuration message may configure the UE to do so. The configuration message may again be transmitted via RRC signalling.

The configuration message may configure the UE to report an amount of data stored in the UE's application transport protocol buffers in all BSRs (i.e. for all logical channels or logical channel groups). In such an example, the configuration message may comprise a BSR-Config message or information element. For example, an indication (ReportextendedBSR) may be added to such a message as follows:

| BSR-Config information element |
|---|

```
-- ASN1START
-- TAG-BSR-CONFIG-START
BSR-Config ::=              SEQUENCE {
    periodicBSR-Timer       ENUMERATED { sf1, sf5, sf10, sf16, sf20, sf32, sf40, sf64,
                            sf80, sf128, sf10, sf320, sf640, sf1280, sf2560, infinity },
    retxBSR-Timer           ENUMERATED { sf10, sf20, sf40, sf80, sf160, sf320, sf640, sf1280, sf2560,
                            sf5120, sf10240, spare5, spare4, spare3, spare2, spare1},
    logicalChannelSR-DelayTimer   ENUMERATED { sf20, sf40, sf64, sf128, sf512 sf1024, sf2560, spare1}       OPTIONAL, --Need R
    ...
         reportExtendedBSR          ENUMERATED     {enabled, disabled }              OPTIONAL, -- Need M
}
-- TAG-BSR-CONFIG-STOP
-- ASN1STOP
```

In an alternative embodiment, the configuration message may configure the UE to report an amount of data stored in the UE's application transport protocol buffers in BSRs for particular logical channels or logical channel groups. In such an example, the configuration message may comprise a LogicalChannelConfig message or information element for each logical channel or logical channel group. For example, an indication (ReportextendedBSR) may be added to such a message as follows:

In step 604, the radio access node receives a BSR. The BSR may be triggered periodically or when new uplink data is made available for transmission from the UE. The BSR may be generated by a MAC entity within the UE, and may comprise a MAC control element. The BSR may take any of the formats described above, for example, with respect to FIGS. 3, 4*a* and 4*b*. In accordance with embodiments of the disclosure, the BSR comprises an indication of a first amount of data available to transmit at the UE, including at

| LogicalChannelConfig information element |
|---|

```
-- ASN1START
-- TAG-LOGICAL-CHANNEL-CONFIG-START
LogicalChannelConfig ::=                   SEQUENCE {
    ul-SpecificParameters                  SEQUENCE {
        priority                           INTEGER (1 .. 16),
        prioritisedBitRate                 ENUMERATED {kBps0, kBps8, kBps16, KBps32, kBps64, kBps128, kBps256, kBps512,
                                           kBps1024, KBps2048, kBps4096, kBps8192, kBps16384, kBps32768, kBps65536, infinity},
        bucketSizeDuration                 ENUMERATED {ms5, ms10, ms20, ms50, ms100, ms150, ms300, ms500, ms1000,
                                           spare7, spare6, spare5, spare4, spare3, spare2, spare1},
        allowedServingCells                SEQUENCE (SIZE (1 .. maxNrofServingCells-1)) OF ServCellIndex          OPTIONAL, -- PDCP-CADuplication
        allowedSCS-List                    SEQUENCE (SIZE (1 .. maxSCSs)) OF SubcarrierSpacing          OPTIONAL, -- Need R
        maxPUSCH-Duration                  ENUMERATED { ms0p02, ms0p04, ms0p0625, ms0p125, ms0p25, ms0p5, spare2, spare1 }
                                                                                                        OPTIONAL, -- Need R
        configuredGrantType1Allowed                                                         ENUMERATED {true}                                       OPTIONAL, -- Need R
        logicalChannelGroup                                         INTEGER     (0 .. maxLCG-ID)           OPTIONAL, -- Need R
        schedulingRequestID                  SchedulingRequestId           OPTIONAL, -- Need R
        logicalChannelSR-Mask                BOOLEAN,
        logicalChannelSR-DelayTimerApplied BOOLEAN,
        ... ,
        bitRateQueryProhibitTimer          ENUMERATED { s0, s0dot4, s0dot8, s1dot6, s3, s6, s12,s30}       OPTIONAL -- Need R
                reportExtendedBSR              ENUMERATED                     {enabled, disabled}                   OPTIONAL, -- Need M
    }                                                                                       OPTIONAL,
-- Cond UL
    ...
}
-- TAG-LOGICAL-CHANNEL-CONFIG-STOP
-- ASN1STOP
``` least data stored in an application transport protocol buffer. The first amount of data may further comprise data stored in one or more other buffers of the UE, such as PDCP, RLC and/or MAC buffers, i.e. a single amount of data is indicated, and that data includes data stored in the application transport protocol buffer and additionally data stored in one or more other buffers. Alternatively, the first amount of data may comprise only the amount of data stored in the application transport protocol buffer. The amount of data stored in other buffers may be provided in separate indications. In either case, the BSR may comprise an indication of the buffers for which amounts of data are reported. The amounts of data may be organized into logical channels or logical channel groups, with separate amounts of data reported for each logical channel or logical channel groups, or only for certain logical channels or logical channel groups.

In step 606, the radio access node prepares an uplink (UL) grant message for the UE, comprising an indication of an amount of resources allocated to the UE for transmitting a second amount of data. The second amount of data varies as a function of the first amount of data, indicated in the BSR received in step 604. For example, the second amount of data may increase as the first amount of data increases. In other words, additional uplink resources may be granted in dependence on the amount of data stored in the application transport buffer. The second amount of data may be equal to the first amount of data (i.e., the radio access node grants sufficient resources to transmit the entirety of the data reported in the BSR). However, the radio access node may have to take into account the competing needs of other UEs that it is serving, and therefore the second amount of data may be less than the first amount of data.

The uplink grant message may comprise an indication of the resources which are to be used for transmitting the data (e.g., frequency resources, such as one or more subcarriers; time resources such as one or more time slots, transmission time intervals, subframes, etc.). The uplink grant may also comprise an indication of the modulation scheme which is to be used for transmitting the data. The uplink grant may comprise an indication of the amount of data (e.g., in bytes) which is to be transmitted, or which can be transmitted, using the allocated resources.

In embodiments where the BSR comprises separate indications of an amount of data stored in an application transport protocol buffer, and an amount of data stored in other buffers, the radio access node may give different priorities to the data stored in the application transport protocol buffer, and the data stored in other buffers. For example, the data stored in the other buffers may be given a higher priority as this data can be expected to be transmitted from the user equipment sooner. Conversely, the data stored in the application transport protocol buffer may take longer to reach lower layers of the protocol stack and be ready for transmission. Therefore resources for the transmission of data in the other buffers may comprise resources at earlier times than resources for the transmission of data in the application transport protocol buffer.

In step 608, the radio access node transmits the uplink grant message to the user equipment.

Those skilled in the art will appreciate that the method described above with respect to FIG. 6 may be performed in multiple stages or as part of multiple processes. For example, the configuration of the UE, described above with respect to steps 600 and 602, may be performed upon the UE's connection to a cell served by the radio access node (e.g. upon connection to the wireless communication system itself, or upon handover to the radio access node). Steps 602 onwards may be performed separately, as and when the UE has data available to transmit to the network.

Figure 7:
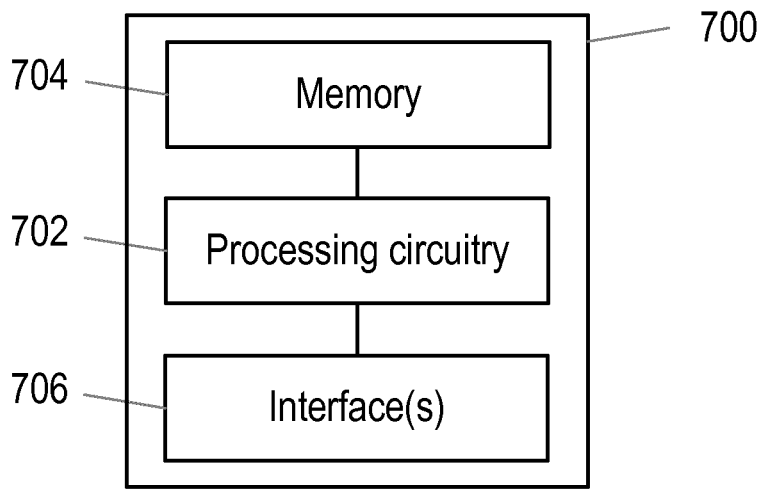
FIGS. 7 and 8 are schematic diagrams of a user equipment according to embodiments of the disclosure.

FIG. 7 is a schematic diagram of a wireless device or user equipment 700 according to embodiments of the disclosure. The user equipment 700 may be configured to perform the signalling of the user equipment 202, described above with respect to FIG. 2, and/or the method described above with respect to FIG. 5.

The user equipment 700 comprises processing circuitry 702 (such as one or more processors, digital signal processors, general purpose processing units, etc), a machine-readable medium 704 (e.g., memory such as read-only memory (ROM), random-access memory, cache memory, flash memory devices, optical storage devices, etc) and one or more interfaces 706. The one or more interfaces 706 may comprise one or more antennas or antenna elements for the transmission and reception of wireless signals. The components are illustrated coupled together in series; however, those skilled in the art will appreciate that the components may be coupled together in any suitable manner (e.g., via a system bus or suchlike).

According to embodiments of the disclosure, the user equipment is configurable to communicate with a radio access node via a plurality of communication protocols, and to communicate with a network node via at least one congestion-controlled application transport protocol. The computer-readable medium 704 stores instructions which, when executed by the processing circuitry 702, cause the user equipment 700 to: generate a buffer status report comprising an indication of a first amount of data available for transmission from the user equipment, the first amount of data including at least data stored in a buffer for data conforming to the congestion-controlled application transport protocol; and transmit the buffer status report to the radio access node.

In further embodiments of the disclosure, the user equipment 700 may comprise power circuitry (not illustrated). The power circuitry may comprise, or be coupled to, power management circuitry and is configured to supply the components of user equipment 700 with power for performing the functionality described herein. Power circuitry may receive power from a power source. The power source and/or power circuitry may be configured to provide power to the various components of user equipment 700 in a form suitable for the respective components (e.g., at a voltage and current level needed for each respective component). The power source may either be included in, or external to, the power circuitry and/or the user equipment 700. For example, the user equipment 700 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 8:
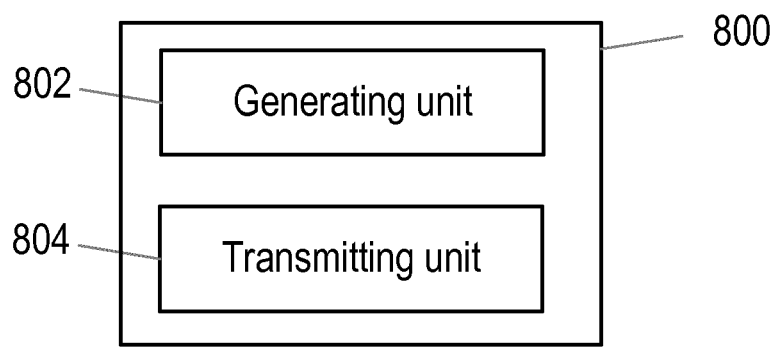

FIG. 8 is a schematic diagram of a user equipment or wireless device 800 according to embodiments of the disclosure. The user equipment 800 may be configured to perform the signalling of the user equipment 202, described above with respect to FIG. 2, and/or the method described above with respect to FIG. 5.

The user equipment 800 comprises a generating unit 802 and a transmitting unit 804. The radio access network node may additionally comprise one or more interfaces (not illustrated). The one or more interfaces 806 may comprise one or more antennas or antenna elements for the transmission and reception of wireless signals.

According to embodiments of the disclosure, the user equipment is configurable to communicate with a radio access node via a plurality of communication protocols, and to communicate with a network node via at least one congestion-controlled application transport protocol. The generating unit 802 is configured to generate a buffer status report comprising an indication of a first amount of data available for transmission from the user equipment. The first amount of data includes at least data stored in a buffer for data conforming to the congestion-controlled application transport protocol. The transmitting unit 804 is configured to transmit the buffer status report to the radio access node.

Figure 9:
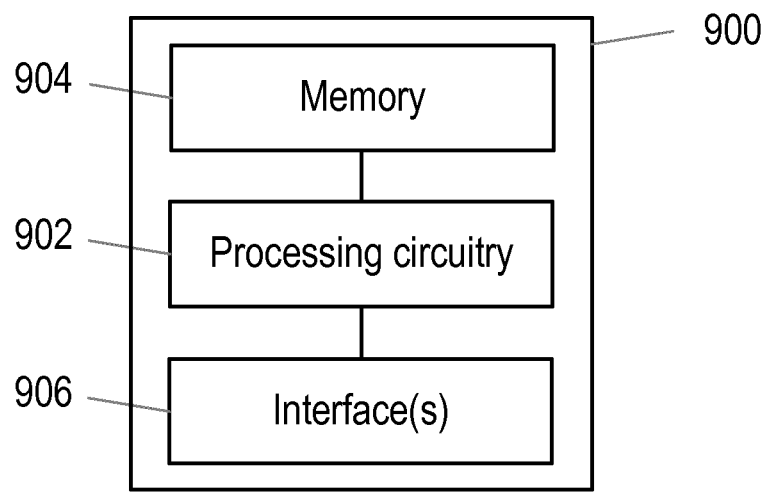
FIGS. 9 and 10 are schematic diagrams of a radio access node according to embodiments of the disclosure.

FIG. 9 is a schematic diagram of a radio access node 900 according to embodiments of the disclosure. The radio access node 900 may be configured to perform the signalling of the radio access node or gNB 204, described above with respect to FIG. 2, and/or the method described above with respect to FIG. 6.

The radio access node 900 comprises processing circuitry 902 (such as one or more processors, digital signal processors, general purpose processing units, etc), a machine-readable medium 904 (e.g., memory such as read-only memory (ROM), random-access memory, cache memory, flash memory devices, optical storage devices, etc) and one or more interfaces 906. The one or more interfaces 906 may comprise one or more antennas or antenna elements for the transmission and reception of wireless signals. The one or more interfaces 906 may additionally comprise an interface (e.g., wireless, electrical or optical) for connection to a backhaul network. The components are illustrated coupled together in series; however, those skilled in the art will appreciate that the components may be coupled together in any suitable manner (e.g., via a system bus or suchlike).

According to embodiments of the disclosure, the computer-readable medium 904 stores instructions which, when executed by the processing circuitry 902, cause the radio access node 900 to: receive a buffer status report from a user equipment, the user equipment being configurable to communicate with the radio access node via a plurality of communication protocols, and to communicate with a network node via at least one congestion-controlled application transport protocol, wherein the buffer status report comprises an indication of a first amount of data available for transmission from the user equipment, the first amount of data including at least data stored in a buffer for data conforming to the congestion-controlled application transport protocol; prepare an uplink grant comprising an indication of radio resources to be used by the user equipment for transmitting a second amount of data in an uplink transmission, wherein the second amount of data varies as a function of the first amount of data; and transmit the uplink grant to the user equipment.

In further embodiments of the disclosure, the radio access node 900 may comprise power circuitry (not illustrated). The power circuitry may comprise, or be coupled to, power management circuitry and is configured to supply the components of radio access node 900 with power for performing the functionality described herein. Power circuitry may receive power from a power source. The power source and/or power circuitry may be configured to provide power to the various components of radio access node 900 in a form suitable for the respective components (e.g., at a voltage and current level needed for each respective component). The power source may either be included in, or external to, the power circuitry and/or the radio access node 900. For example, the radio access node 900 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 10:
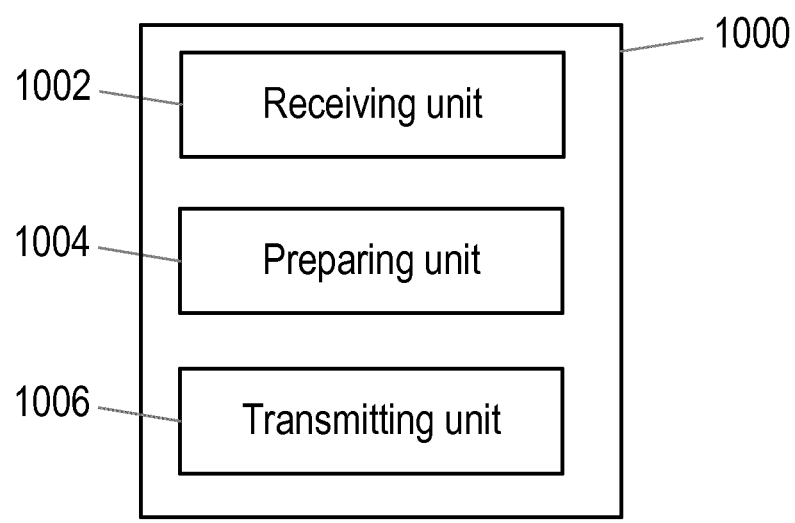

FIG. 10 is a schematic diagram of a radio access node 1000 according to embodiments of the disclosure. The radio access node 1000 may be configured to perform the signalling of the radio access node or gNB 104, described above with respect to FIG. 2, and/or the method described above with respect to FIG. 6.

The radio access node 1000 comprises a receiving unit 1002, a preparing unit 1004 and a transmitting unit 1006. The wireless device may additionally comprise one or more interfaces (not illustrated). The one or more interfaces may comprise one or more antennas or antenna elements for the transmission and reception of wireless signals. The one or more interfaces 906 may additionally comprise an interface (e.g., wireless, electrical or optical) for connection to a backhaul network.

According to embodiments of the disclosure, the receiving unit 1002 is configured to receive a buffer status report from a user equipment. The user equipment is configurable to communicate with the radio access node via a plurality of communication protocols, and to communicate with a network node via at least one congestion-controlled application transport protocol. The buffer status report comprises an indication of a first amount of data available for transmission from the user equipment. The first amount of data includes at least data stored in a buffer for data conforming to the congestion-controlled application transport protocol. The preparing unit 1004 is configured to prepare an uplink grant comprising an indication of radio resources to be used by the user equipment for transmitting a second amount of data in an uplink transmission. The second amount of data varies as a function of the first amount of data. The transmitting unit is configured to transmit the uplink grant to the user equipment.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 11:
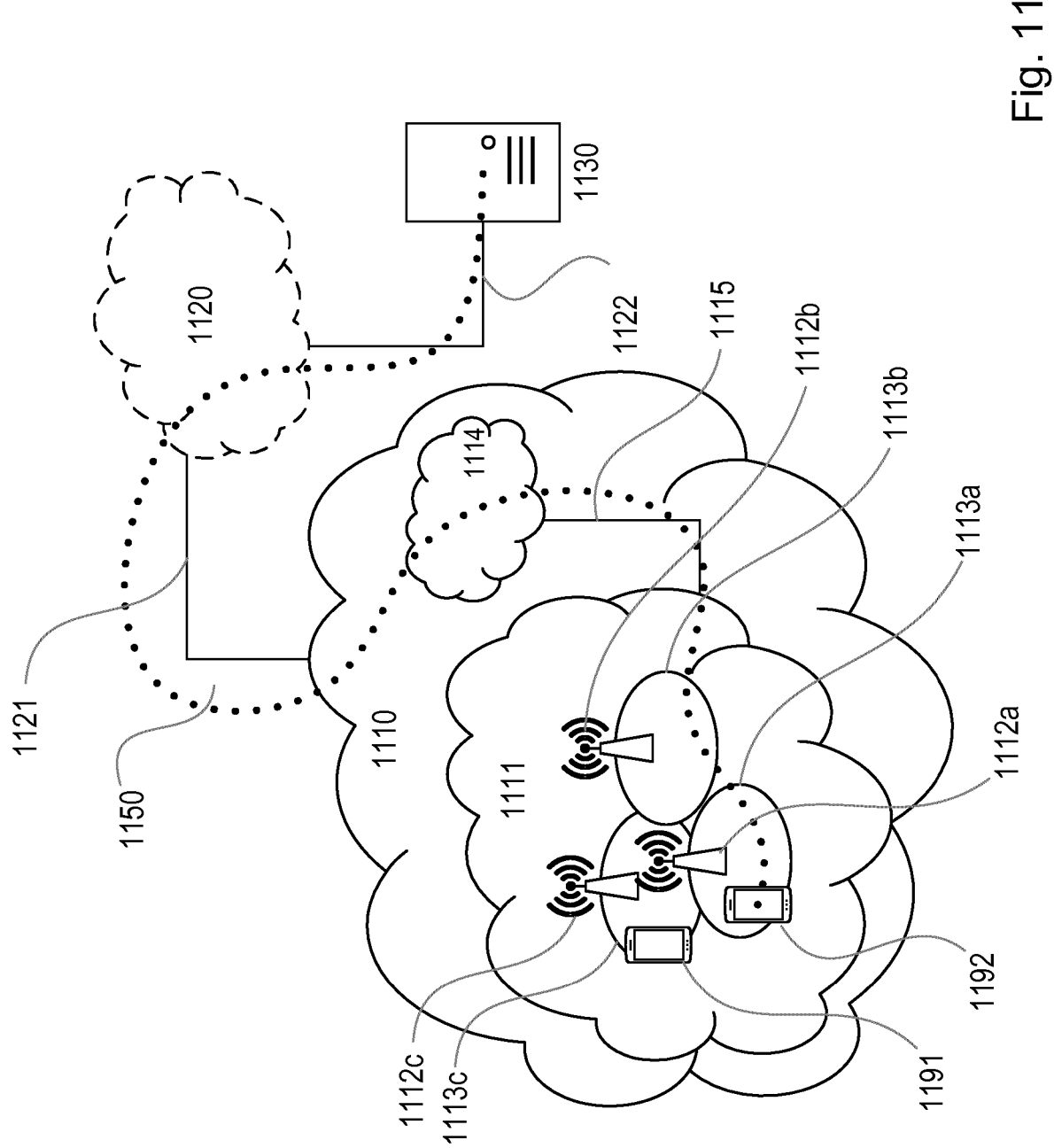
FIG. 11 shows a telecommunication network connected via an intermediate network to a host computer in accordance with some embodiments of the disclosure.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
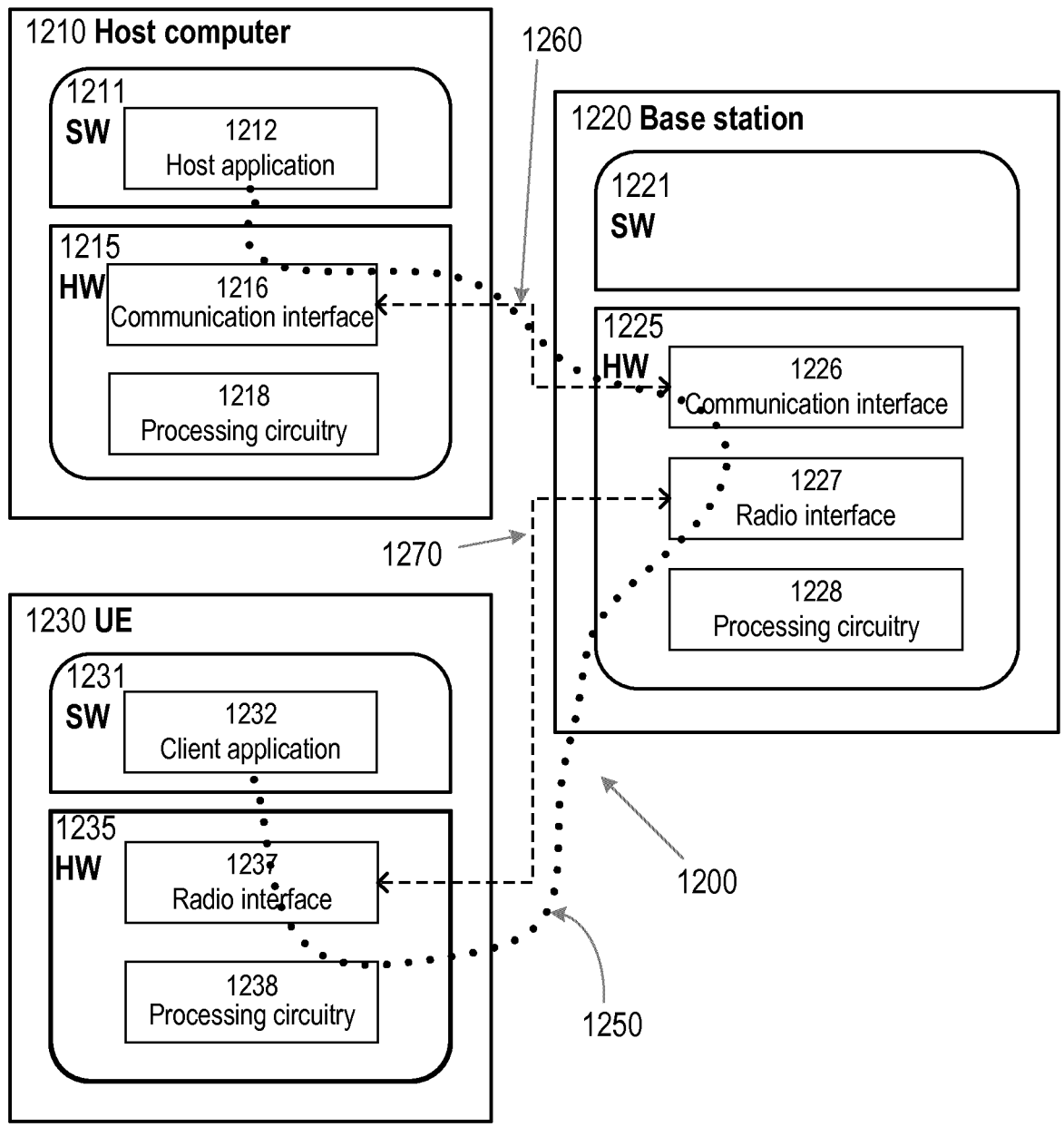
FIG. 12 shows a host computer communicating via a base station with a user equipment over a partially wireless connection in accordance with some embodiments of the disclosure.

It is noted that host computer 1210, base station 1220 and UE 1230 illustrated in FIG. 12 may be similar or identical to host computer 1230, one of base stations 1112*a*, 1112*b*, 1112*c* and one of UEs 1191, 1192 of FIG. 11, respectively. This is to say, the inner workings of these entities may be as shown in FIG. 11 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve latency and thereby provide benefits such as reduced user waiting time and improved response of applications, e.g. remote applications such as vehicle control/remote driving.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
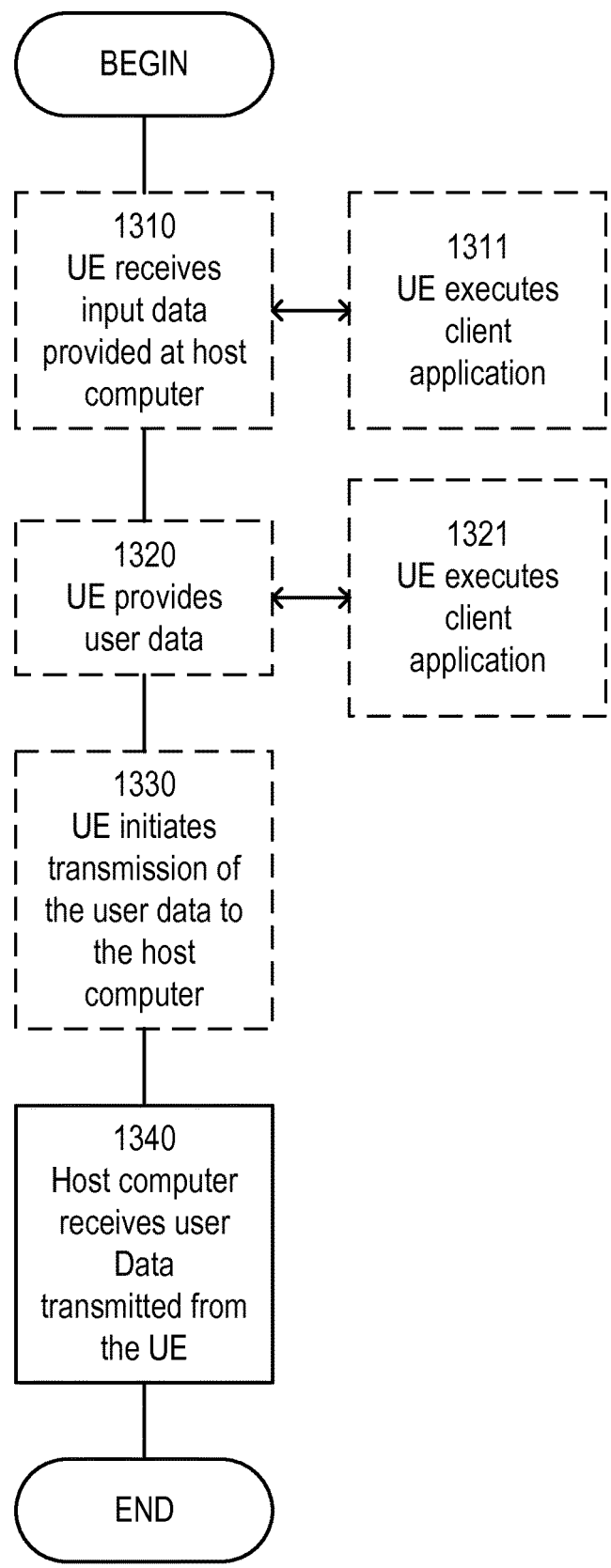
FIGS. 13 and 14 show methods implemented in a communication system including a host computer, a base station and a user equipment in accordance with some embodiments of the disclosure.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
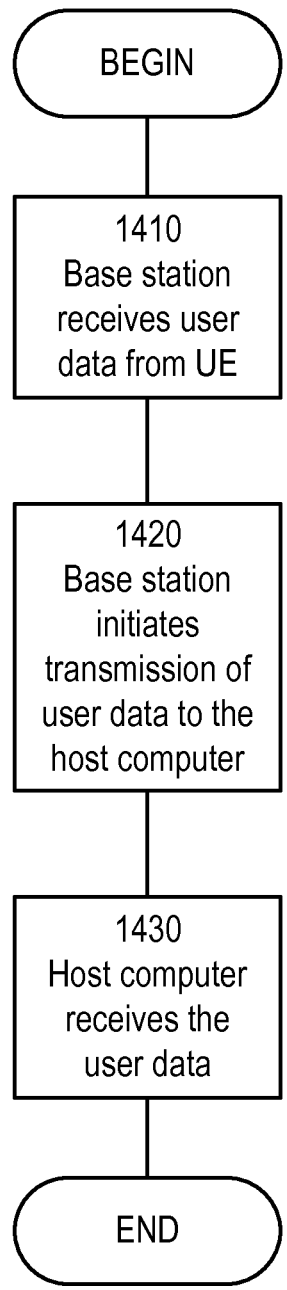

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The following numbered paragraphs set out example embodiments of the disclosure:

Embodiment 1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of claims 15 to 24.

Embodiment 2. The communication system of the previous embodiment further including the base station.

Embodiment 3. The communication system of the previous 2 embodiments, further including the UE, wherein the UE is configured to communicate with the base station.

Embodiment 4. The communication system of the previous 3 embodiments, wherein:
  the processing circuitry of the host computer is configured to execute a host application, thereby providing the user data; and
  the UE comprises processing circuitry configured to execute a client application associated with the host application.

Embodiment 5. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs any of the steps of any of claims 15 to 24.

Embodiment 6. The method of the previous embodiment, further comprising, at the base station, transmitting the user data.

Embodiment 7. The method of the previous 2 embodiments, wherein the user data is provided at the host computer by executing a host application, the method further comprising, at the UE, executing a client application associated with the host application.

Embodiment 8. A user equipment (UE) configured to communicate with a base station, the UE comprising a radio interface and processing circuitry configured to performs the of the previous 3 embodiments.

Embodiment 9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of claims 1 to 14.

Embodiment 10. The communication system of the previous embodiment, wherein the cellular network further includes a base station configured to communicate with the UE.

Embodiment 11. The communication system of the previous 2 embodiments, wherein:
the processing circuitry of the host computer is configured to execute a host application, thereby providing the user data; and
the UE's processing circuitry is configured to execute a client application associated with the host application.

Embodiment 12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of claims 1 to 14.

Embodiment 13. The method of the previous embodiment, further comprising at the UE, receiving the user data from the base station.

Embodiment 14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of claims 1 to 14.

Embodiment 15. The communication system of the previous embodiment, further including the UE.

Embodiment 16. The communication system of the previous 2 embodiments, further including the base station, wherein the base station comprises a radio interface configured to communicate with the UE and a communication interface configured to forward to the host computer the user data carried by a transmission from the UE to the base station.

Embodiment 17. The communication system of the previous 3 embodiments, wherein:
the processing circuitry of the host computer is configured to execute a host application; and
the UE's processing circuitry is configured to execute a client application associated with the host application, thereby providing the user data.

Embodiment 18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

Embodiment 19. A method implemented in a communication system including a host computer, a base station and a user equipment (UE), the method comprising:
at the host computer, receiving user data transmitted to the base station from the UE, wherein the UE performs any of the steps of any of claims 1 to 14.

Embodiment 20. The method of the previous embodiment, further comprising, at the UE, providing the user data to the base station.

Embodiment 21. The method of the previous 2 embodiments, further comprising:
at the UE, executing a client application, thereby providing the user data to be transmitted; and
at the host computer, executing a host application associated with the client application.

Embodiment 22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

Embodiment 23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of claims 15 to 24.

Embodiment 24. The communication system of the previous embodiment further including the base station.

Embodiment 25. The communication system of the previous 2 embodiments, further including the UE, wherein the UE is configured to communicate with the base station.

Embodiment 26. The communication system of the previous 3 embodiments, wherein:
the processing circuitry of the host computer is configured to execute a host application;
the UE is configured to execute a client application associated with the host application, thereby providing the user data to be received by the host computer.

Embodiment 27. A method implemented in a communication system including a host computer, a base station and a user equipment (UE), the method comprising:
at the host computer, receiving, from the base station, user data originating from a transmission which the base station has received from the UE, wherein the UE performs any of the steps of any of claims 1 to 14.

Embodiment 28. The method of the previous embodiment, further comprising at the base station, receiving the user data from the UE.

Embodiment 29. The method of the previous 2 embodiments, further comprising at the base station, initiating a transmission of the received user data to the host computer.

The invention claimed is:

1. A method performed by a user equipment, the user equipment being configurable to communicate with a radio access node via a plurality of communication protocols, the plurality of communication protocols comprising one or more of: a packet data convergence protocol (PDCP); a radio link control (RLC) protocol; or media access control (MAC) protocol, and to communicate with a core network node via at least one congestion-controlled application transport protocol, the method comprising:
generating a buffer status report comprising an indication of a first amount of data available for transmission from the user equipment, the first amount of data including data stored in an application transport protocol buffer for data conforming to the congestion-controlled application transport protocol, the congestion-controlled application transport protocol comprising one or more of: a transmission control protocol (TCP); a user datagram protocol (UDP); and a quick UDP internet connections (QUIC), and the buffer status report comprising respective separate indications for an amount of data stored in the application transport protocol buffer and an amount of data stored in one or more other buffers such that the buffer status report comprises one or more further indications of one or more respective amounts of data stored in the respective one or more other buffers, one or more other buffers comprising one or more of a PDCP buffer; an RLC protocol buffer; or a MAC protocol buffer; and transmitting the buffer status report to the radio access node.

2. The method of claim 1, further comprising:

receiving an uplink grant from the radio access node comprising an indication of radio resources to be used by the user equipment for transmitting a second amount of data in an uplink transmission; and based on the second amount of data indicated by the uplink grant, setting a congestion window of the congestion-controlled application transport protocol.

3. The method of claim 2, wherein the congestion window is set to one of:

the second amount of data, or the smaller of the second amount of data and a configured threshold amount of data.

4. The method claim 1, wherein the congestion-controlled application transport protocol is configured to release data from the application transport protocol buffer for data conforming to the congestion-controlled application transport protocol for transmission from the user equipment as a function of the congestion window.

5. The method claim 1, further comprising:

receiving a configuration message from the radio access node, the configuration message comprising an instruction to generate one or more buffer status reports comprising an indication of a first amount of data available for transmission from the user equipment, the amount of data including at least data stored in a buffer for data conforming to the congestion-controlled application transport protocol.

6. A method performed by a radio access node, the method comprising:

receiving a buffer status report from a user equipment, the user equipment being configurable to communicate with the radio access node via a plurality of communication protocols, the one or more communication protocols comprising one or more of: a packet data convergence protocol (PDCP); a radio link control (RLC) protocol; or a media access control (MAC) protocol, and to communicate with a core network node via at least one congestion-controlled application transport protocol, the buffer status report comprising an indication of a first amount of data available for transmission from the user equipment, the first amount of data including data stored in an application transport protocol buffer for data conforming to the congestion-controlled application transport protocol, the congestion-controlled application transport protocol comprising one or more of: a transmission control protocol (TCP); a user datagram protocol (UDP); and a quick UDP internet connections (QUIC), and the buffer status report comprising respective separate indications for the amount of data stored in the application transport protocol buffer and an amount of data stored in one or more other buffers such that the buffer status report comprises one or more further indications of one or more respective amounts of data stored in the respective one or more other buffers, one or more other buffers comprising one or more of a PDCP buffer; an RLC protocol buffer; or a MAC protocol buffer;

preparing an uplink grant comprising an indication of radio resources to be used by the user equipment for transmitting a second amount of data in an uplink transmission, the second amount of data varying as a function of the first amount of data, and preparing the uplink grant comprising giving higher priority to data conforming to one or more of the plurality of communication protocols than to data conforming to the congestion-controlled application transport protocol; and transmitting the uplink grant to the user equipment.

7. The method of claim 6, wherein the second amount of data increases as the first amount of data increases and/or wherein the second amount of data further varies as a function of one or more buffer status reports received from one or more further user equipment.

8. The method of claim 6, further comprising:

transmitting a configuration message to the user equipment, the configuration message comprising an instruction to generate one or more buffer status reports comprising an indication of a first amount of data available for transmission from the user equipment, the amount of data including at least data stored in a buffer for data conforming to the congestion-controlled application transport protocol.

9. The method of claim 8, further comprising:

receiving an indication of a capability of the user equipment to generate buffer status reports comprising an indication of an amount of data available for transmission from the user equipment, the amount of data including at least data stored in a buffer for data conforming to the congestion-controlled application transport protocol, and wherein the step of transmitting the configuration message is responsive to receipt of the indication of the capability of the user equipment.

10. A user equipment, the user equipment being configurable to communicate with a radio access node via a plurality of communication protocols, wherein the one or more communication protocols comprising one or more of: a packet data convergence protocol (PDCP); a radio link control (RLC) protocol; or a media access control (MAC) protocol, and to communicate with a core network node via at least one congestion-controlled application transport protocol, the user equipment comprising processing circuitry and a non-transitory machine-readable medium storing instructions which, when executed by the processing circuitry, cause the user equipment to:

generate a buffer status report comprising an indication of a first amount of data available for transmission from the user equipment, the first amount of data including data stored in an application transport protocol buffer for data conforming to the congestion-controlled application transport protocol, the congestion-controlled application transport protocol comprising one or more of: a transmission control protocol (TCP); a user datagram protocol (UDP); and a quick UDP internet connections (QUIC), and the buffer status report comprising respective separate indications for the amount of data stored in the application transport protocol buffer and an amount of data stored in one or more other buffers such that the buffer status report comprises one or more further indications of one or more respective amounts of data stored in the respective one or more other buffers, one or more other buffers comprising one or more of a PDCP buffer; an RLC protocol buffer; or a MAC protocol buffer; and transmit the buffer status report to the radio access node.

11. The user equipment of claim 10, wherein the user equipment is further caused to:

receive an uplink grant from the radio access node comprising an indication of radio resources to be used by the user equipment for transmitting a second amount of data in an uplink transmission; and based on the second amount of data indicated by the uplink grant, set a congestion window of the congestion-controlled application transport protocol.

12. The user equipment of claim 11, wherein the congestion window is set to one of:

the second amount of data; and the smaller of the second amount of data and a configured threshold amount of data.

13. A radio access node, the radio access node comprising processing circuitry and a non-transitory machine-readable medium storing instructions which, when executed by the processing circuitry, cause the radio access node to:

receive a buffer status report from a user equipment, the user equipment being configurable to communicate with the radio access node via a plurality of communication protocols, the one or more communication protocols comprising one or more of: a packet data convergence protocol (PDCP); a radio link control (RLC) protocol; or a media access control (MAC) protocol, and to communicate with a core network node via at least one congestion-controlled application transport protocol, the buffer status report comprising an indication of a first amount of data available for transmission from the user equipment, the first amount of data including data stored in a buffer for data conforming to the congestion-controlled application transport protocol, the congestion-controlled application transport protocol comprising one or more of: a transmission control protocol (TCP); a user datagram protocol (UDP); and a quick UDP internet connections (QUIC), and the buffer status report comprising respective separate indications for the amount of data stored in the application transport protocol buffer and an amount of data stored in one or more other buffers such that the buffer status report comprises one or more further indications of one or more respective amounts of data stored in the respective one or more other buffers, one or more other buffers comprising one or more of a PDCP buffer; an RLC protocol buffer; or a MAC protocol buffer;

prepare an uplink grant comprising an indication of radio resources to be used by the user equipment for transmitting a second amount of data in an uplink transmission, the second amount of data varying as a function of the first amount of data, preparing the uplink grant comprising giving higher priority to data conforming to one or more of the plurality of communication protocols than to data conforming to the congestion-controlled application transport protocol; and transmit the uplink grant to the user equipment.

* * * * *